United States Patent Office 3,661,908
Patented May 9, 1972

3,661,908
2-(5'-NITRO-2'-FURYL)-4-AMINO-THIENO[3,2-d] PYRIMIDINES AND SALTS THEREOF
Eberhard Woitun and Wolfgang Reuter, Biberach (Riss), Germany, assignors to Boehringer Ingelheim G.m.b.H., Ingelheim/Rhein, Germany
No Drawing. Filed Nov. 18, 1970, Ser. No. 90,841
Claims priority, application Germany, Nov. 26, 1969, P 19 59 403.7; Oct. 16, 1970, P 20 50 814.9, P 20 50 815.0, P 20 50 816.1
Int. Cl. C07d 99/06
U.S. Cl. 260—256.5 R
11 Claims

ABSTRACT OF THE DISCLOSURE

Compounds of the formula

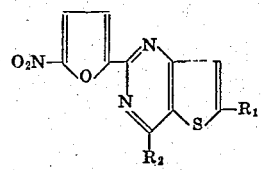

wherein $R_1$ is hydrogen or methyl, and
$R_2$ is amino, (alkyl of 1 to 5 carbon atoms)-amino, di-(alkyl of 1 to 4 carbon atoms)-amino, (monohydroxyalkyl of 2 to 5 carbon atoms)-amino, (2,3-dihydroxy-n-propyl)-amino, (alkoxy of 1 to 2 carbon atoms-alkyl of 1 to 3 carbon atoms)-amino, N-(ω-hydroxy-alkyl of 2 to 3 carbon atoms)-N-(alkyl of 1 to 4 carbon atoms)-amino, N-methyl-D-glucamino, di-(hydroxy-alkyl of 1 to 5 carbon atoms)-amino, [(di-alkyl of 1 to 2 carbon atoms)-amino-alkyl of 2 to 3 carbon atoms]-amino, (1-methyl-2-hydroxy-ethyl)-amino, (1-phenyl-2-hydroxy]ethyl)-amino, (2-hydroxy-3-diethylamino-n-propyl)-amino, (alkanoyl of 1 to 2 carbon atoms)-amino, chloroacetyl-amino, dichloroacetyl-amino, (amino-alkyl of 2 to 3 carbon atoms)-amino, (acetyl-amino-alkyl of 2 to 3 carbon atoms)-amino, allylamino, anilino, chloroanilino, methylanilino, hydroxyanilino, methoxyanilino, N-methyl-anilino, benzylamino, phenethyl-amino, cyclohexyl-amino, (hydroxy-cyclohexyl)-amino, pyrrolidino, piperidino, hydroxy-piperidino, morpholino, thiomorpholino, thiomorpholino-1-oxide, piperazino, N-methyl-piperazino, N-hydroxyethyl-piperazino, N-formyl-piperazino or N-carbethoxy-piperazino, and non-toxic, pharmacologically acceptable acid addition salts thereof; the compounds as well as their salts are useful as bactericidal agents against grampositive and gramnegative bacteria, as fungicides and as trichomonacides, especially against Trichomonas vaginalis, in warm-blooded animals.

This invention relates to novel 2-(5'-nitro-2'-furyl)-4-amino-thieno[3,2-d]pyrimidines and non-toxic pharmacologically acceptable acid addition salts thereof, as well as to various methods of preparing these compounds.

More particularly, the present invention relates to compounds of the formula

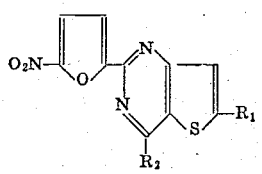

(I)

wherein $R_1$ is hydrogen or methyl, and
$R_2$ is amino, (alkyl of 1 to 5 carbon atoms)-amino, di-(alkyl of 1 to 4 carbon atoms)-amino, (monohydroxyalkyl of 2 to 5 carbon atoms)-amino, (2,3-dihydroxy-n-propyl)-amino, (alkoxy of 1 to 2 carbon atoms-alkyl of 1 to 3 carbon atoms)-amino, N-(ω-hydroxy-alkyl of 2 to 3 carbon atoms)-N-(alkyl of 1 to 4 carbon atoms) - amino, N - methyl - D - glucamino, di-(hydroxy - alkyl of 1 to 5 carbon atoms) - amino, [(dialkyl of 1 to 2 carbon atoms)-amino-alkyl of 2 to 3 carbon atoms]-amino, (1-methyl - 2 - hydroxy-ethyl)-amino, (1-phenyl - 2 - hydroxy]ethyl)-amino, (2-hydroxy-3-diethylamino-n-propyl)-amino, (alkanoyl of 1 to 2 carbon atoms)-amino, chloroacetyl-amino, dichloroacetyl-amino, (amino-alkyl of 2 to 3 carbon atoms)-amino, (acetyl-amino-alkyl of 2 to 3 carbon atoms)-amino, allylamino, anilino, chloroanilino, methylanilino, hydroxyanilino, methoxyanilino, N-methylanilino, benzylamino, phenethyl-amino, cyclohexylamino, (hydroxy - cyclohexyl) - amino, pyrrolidino, piperidino, hydroxy-piperidino, morpholino, thiomorpholino, thiomorpholino-1-oxide, piperazino, N-methylpiperazino, N - hydroxyethyl - piperazino, N-formyl-piperazino or N-carbethoxy-piperazino, and non-toxic, pharmacologically acceptable acid addition salts thereof.

The compounds of the Formula I may be prepared by the following methods:

Method A

For the preparation of a compound of the Formula I wherein $R_2$ has the meanings recited above except (alkanoyl of 1 to 2 carbon atoms)-amino, chloroacetyl-amino and dichloroacetyl-amino, by reacting a 2-(5'-nitro-2'-furyl)-thieno[3,2-d]pyrimidine of the formula

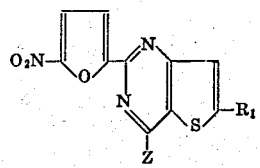

(II)

wherein $R_1$ has the same meanings as in Formula I and Z is halogen, mercapto or lower alkyl-mercapto, with an amine of the formula $$R'_2-H \quad (III)$$

wherein $R'_2$ has the same meanings as $R_2$ in Formula I except (alkanoyl of 1 to 2 carbon atoms)-amino, chloroacetyl-amino and dichloroacetyl-amino.

The reaction is preferably carried out in the presence of an inert organic solvent or suspension agent at temperatures between 20 and 150° C. If Z in Formula II is halogen, the presence of a hydrogen halide-binding agent is required.

A polar inert organic solvent, such as an alkanol, dimethylformamide, dimethylsulfoxide, 1-methyl-2-pyrrolidone or hexamethyl-phosphoric acid triamide, is preferably used as the solvent or suspension medium.

The hydrogen halide-binding agent may be an equimolar amount of an inorganic or tertiary organic base, or also a substantial molar excess of the amine of the Formula III over and above the stoichiometrically required amount.

Method B

By reacting a 2-(2'-furyl)-4-amino-thieno[3,2-d]pyrimidine of the formula

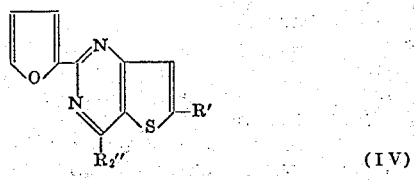

(IV)

wherein $R_1$ has the same meanings as in Formula I and $R_2''$ has the same meanings as $R_2$ in Formula I except anilino and phenylalkyl-amino, with a nitrating agent, such as nitric acid, mixtures of nitric acid and sulfuric acid or mixtures of nitric acid and acetic acid anhydride.

In those instances where $R_2''$ is a substituent comprising a free amino or hydroxyl group, the said amino or hydroxyl group must, prior to the performance of the nitrating reaction, be provided with a protective group, such as lower alkanoyl, pursuant to known methods; after completion of the nitration, the protective group is removed again according to conventional methods.

In general, temperatures of 0 to 30° C. are required for the performance of the nitration. In some instances the presence of an inert diluent or solvent is of advantage.

Method C

By reacting a 2-(5'-bromo-2'-furyl)-4-amino-thieno-[3,2-d]pyrimidine of the formula

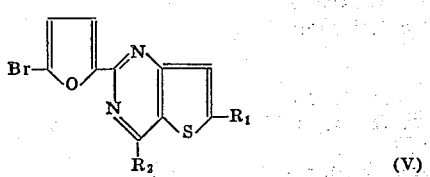

(V)

wherein $R_1$ and $R_2$ have the same meanings as in Formula I, with a nitrous acid salt in the presence of a polar organic solvent and at a temperature between 0 and 120° C.

Preferred examples of nitrous acid salts are alkali metal nitrites or alkaline earth metal nitrites.

Examples of suitable polar organic solvents are aliphatic organic acids, such as glacial acetic acid, dimethylformamide and dimethylsulfoxide.

Method D

By reacting a 2-(5'-carboxy-2'-furyl)-4-aminothieno[3,2-d]pyrimidine of the formula

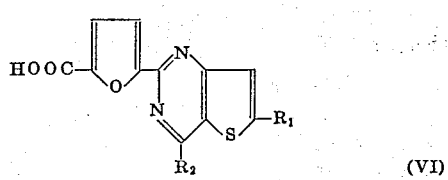

(VI)

wherein $R_1$ and $R_2$ have the same meanings as in Formula I, with nitric acid or a salt of nitric acid in the presence of a mineral acid.

The reaction is performed in the presence of a strong mineral acid, such as concentrated sulfuric acid, which simultaneously serves as the solvent medium, and at temperatures between −20 and +50° C., preferably at 0 to 20° C. Examples of especially suitable salts of nitric acid are its alkali metal or alkaline earth metals salts.

If $R_2$ in Formula VI comprises free amino or hydroxyl groups, these are provided with protective groups, such as acyl radicals, prior to the reaction in customary manner. After completion of the reaction, these protective groups are split off again, if desired.

Method E

For the preparation of a compound of the Formula I wherein $R_2$ is a (alkanoyl of 1 to 2 carbon atoms)-amino, chloroacetyl-amino or dichloroacetyl-amino, by acylating a 2-(5'-nitro-2'-furyl)-4-amino-thieno[3,2-d] pyrimidine

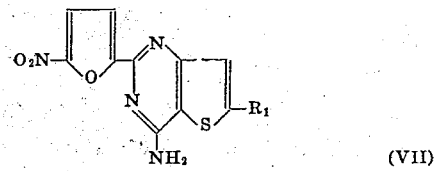

(VII)

wherein $R_1$ has the same meanings as in Formula I, with a conventional acylating agent, such as an acid chloride or an acid anhydride, at a temperature up to the boiling point of the particular acylating agent which is used.

The compounds of the Formula I are organic bases and therefore form acid addition salts with inorganic or organic acids. Examples of non-toxic, pharmacologically acceptable acid addition salts are those formed with hydrochloric acid, hydrobromic acid, sulfuric acid, tartaric acid, adipic acid, fumaric acid, maleic acid, citric acid, 8-chlorotheophylline or the like.

The starting compounds of the Formula II wherein Z is halogen may be prepared by reacting a 5-nitrofuran-2-iminocarboxylic acid lower alkyl ester [see W. R. Sherman et al., J. Med. Chem. 8, 25 (1965)] with a 3-amino-thiophene-2-carboxylic acid lower alkyl ester (see German Patent No. 1,055,007), and halogenating the 2-(5'-nitro-2'-furyl)-4-hydroxy-thieno[3,2-d]pyrimidine formed thereby with a phosphorus oxyhalide, phosphorus pentahalide or thionyl halide.

The starting compounds of the Formula IV may be prepared by reacting a furan-2-iminocarboxylic acid lower alkyl ester [see A. Pinner, Chem. Ber. 25, 1416 (1892)] with a 3 - amino - thiophene - 2 - carboxylic acid lower alkyl ester to form a 2-(2'-furyl)-4-hydroxy-thieno-[3,2-d]pyrimidine, subsequently halogenating the latter with a halogenating agent, such as a phosphorus oxy halide, and reacting the corresponding 2-(2'-furyl)-4-halo-thieno[3,2-d]pyrimidine obtained thereby with an amine of the formula $R_2''H$ where $R_2''$ has the same meanings as in Formula IV.

The starting compounds of the Formula II wherein Z is mercapto or lower alkyl-mercapto may be prepared by reacting a corresponding 2 - (5'-nitro-2'-furyl) - 4 - halo-thieno[3,2-d]pyrimidine with thiourea and, if necessary, subsequently alkylating the reaction product with a potassium alcoholate for example.

The starting compounds of the Formula V may be prepared by reacting a compound of the Formula IV with a stoichiometric amount of bromine, preferably in the presence of an organic solvent and of a hydrogen halide-binding agent at a temperature between 0 and 30° C. Suitable solvent media are inert solvents, such as 1,2-dichloro-ethane, or polar solvents, such as glacial acetic acid. Anhydrous sodium acetate may be used as the hydrogen halide-binding agent, for example.

The starting compounds of the Formula VI may, for example, be prepared by reacting a 5-carbalkoxy-2-cyano-furan with a 3-amino-thiophene-2-carboxylic acid ester, halogenating the reaction product with phosphorus oxy chloride, for instance, reacting the halogenation product with an amine of the Formula $R_2H$, where $R_2$ has the same meanings as in Formula I, and hydrolizing the reaction product in the presence of an acid, such as hydrochloric acid.

The starting compounds of the Formula VII may be obtained by reacting a compound of the Formula II with ammonia.

The following examples further illustrate the present invention and will enable others skilled in the art to understand it more completely. It should be understood, however, that the invention is not limited solely to the particular examples given below.

Preparation of starting compounds:

EXAMPLE A 2-(5'-nitro-2'-furyl)-4-hydroxy-thieno[3,2-d]pyrimidine 18.4 gm. (0.1 mol) of ethyl 5-nitrofuran-2-iminocarboxylate and 17.3 gm. (0.11 mol) of methyl 3-amino-thiophene-2-carboxylate were intimately admixed with each other, and the mixture was heated for one hour at 130° C. in a flask. A crystalline substance began to separate out of the clear melt after a short period of time. At the end of the reaction period the contents of the flask had completely solidified. The product was triturated with ether, the mixture was vacuum filtered, and the filter cake was recrystallized from dimethylformamide. 17.1 gm. (65% of theory) of 2-(5'-nitro-2'-furyl)-4-hydroxy-thieno[3,2-d]pyrimidine, M.P. >300° C., were obtained.

Analysis.—$C_{10}H_5N_3O_4S$; mol. wt. 263.24. Calculated (percent): C, 45.62; H, 1.92; N, 15.97. Found (percent): C, 45.75; H, 1.86; N, 16.05.

(a) In analogous fashion 6 - methyl - 2 - (5' - nitro-2'-furyl)-4-hydroxy-thieno[3,2-d]pyrimidine, M.P.>300° C. (recrystallized from dimethylformamide), was prepared from ethyl 5-nitrofuran-2-iminocarboxylate and methyl 3-amino-5-methyl-thiophene-2-carboxylate.

EXAMPLE B 4-chloro-2-(5'-nitro-2'-furyl)-thieno[3,2-d]pyrimidine

A mixture of 26.3 gm. (0.1 mol) of 2-(5'-nitro-2'-furyl)-4-hydroxy-thieno[3,2-d]pyrimidine and 100 ml. of phosphorus oxychloride was refluxed for three hours; only incomplete dissolution took place. The excess phosphorus oxychloride was distilled off in vacuo, and the residue was introduced into ice water. The aqueous mixture was vacuum filtered, and the filter cake was dried and recrystallized from dioxane. 23.1 gm. (82% of theory) of 4-chloro - 2 - (5'-nitro-2'-furyl)-thieno[3,2-d]pyrimidine, M.P. 249–250° C., were obtained.

Analysis.—$C_{10}H_{14}ClN_3O_3S$; mol. wt. 281.69. Calculated (percent): C, 42.64; H, 5.01; Cl, 12.50. Found (percent): C, 42.51; H, 5.09; Cl, 12.67.

(a) In analogous fashion 4 - chloro - 6 - methyl-2-(5'-nitro-2'-furyl)-thieno[3,2-d]pyrimidine, M.P. 190–191° C. (recrystallized from dioxane), was prepared from 6-methyl - 2 - (5'-nitro-2'-furyl)-4-hydroxy-thieno[3,2 - d] pyrimidine and phosphorus oxychloride.

EXAMPLE C 4-mercapto-2-(5'-nitro-2'-furyl)-thieno[3,2-d] pyrimidine 9.5 gm. (0.125 mol) of thiourea were added to a refluxing solution of 2.8 gm. (0.01 mol) of 4-chloro-2-(5'-nitro-2'-furyl)-thieno[3,2-d]pyrimidine in 100 ml. of dimethylformamide. Five minutes after the thiourea had been added, the resulting dark solution was cooled to room temperature and then poured into one liter of ice water. The substance which crystallized out was collected by vacuum filtration, and the filter cake was recrystallized from dioxane. 1.5 gm. (54% of theory) of 4-mercapto-2-(5'-nitor-2'-furyl)-thieno[3,2-d]pyrimidine, M.P. 215° C. (decomp.), were obtained.

Analysis. $C_{10}H_5N_3O_3S_2$; mol. wt. 279.30. Calculated (percent): C, 43.00; H, 1.81; N, 15.06; S, 22.94. Found (percent): C, 42.90; H, 1.84; N, 15.20; S, 22.75.

EXAMPLE D 4-methylmercapto-2-(5'-nitro-2'-furyl)-thieno[3,2] pyrimidine

A suspension of 2.8 gm. (0.01 mol) of 4-mercapto-2-(5'-nitro-2'-furyl)-thieno[3,2-d]pyrimidine in 100 ml. of dimethylsulfoxide was added to a stirred solution of 0.85 gm. (0.012 mol) of potassium methylate in 150 ml. of dimethylsulfoxide at room temperature. A red solution was formed, to which 1.7 gm. (0.012 mol) of methyl iodide were added dropwise. Thereafter, the resulting reaction mixture was poured into ice water, and the crystalline precipitate formed thereby was collected by vacuum filtration and recrystallized from dimethylformamide. 1.9 gm. (65% of theory) of 4-methylmercapto-2-(5'-nitro-2'-furyl)-thieno[3,2-d]pyrimidine, M.P. 240° C., were obtained.

Analysis.—$C_{11}H_7N_3O_3S_2$; mol. wt. 293.33. Calculated (percent): C, 45.11; H, 2.41; N, 14.33; S, 21.86. Found (percent): C, 45.28; H, 2.50; N, 14.27; S, 21.70.

EXAMPLE E 2-(2'-furyl)-4-hydroxy-thieno[3,2-d]pyrimidine 36.8 gm. (0.2 mol) of ethyl furan-2-iminocarboxylate and 33.0 gm. (0.21 mol) of methyl 3-amino-thiophene-2-carboxylate were dissolved in 60 ml. of xylene, and the solution was refluxed for 15 hours. Thereafter, the reaction solution was allowed to cool, and the crystalline precipitate was collected by vacuum filtration and recrystallized from dimethylformamide. 19.1 gm. (44% of of theory) 2-(2'-furyl)-4-hydroxy - thieno[3,2-d]pyrimidine, M.P. 260° C., were obtained.

Analysis.—$C_{10}H_6N_2O_2S$; mol. wt. 218.24. Calculated (percent): C, 55.0; H, 2.77; N, 12.85. Found (percent): C, 55.06; H, 2.81; N, 12.80.

EXAMPLE F 4-chloro-2-(2'-furyl)-thieno[3,2-d]pyrimidine

A mixture of 21.8 gm. (0.1 mol) of 2-(2'-furyl)-4-hydroxy-thieno[3,2-d]pyrimidine and 100 ml. of phosphorus oxychloride was refluxed for one hour, whereby a clear solution was formed. Thereafter, the excess phosphorus oxychloride was distilled off in vacuo, and the residue was introduced into ice water. The crystalline precipitate formed thereby was collected by vacuum filtration, dried and recrystallized from xylene. 19.0 gm. (80% of theory) of 4-chloro-2-(2'-furyl)-thieno[3,2-d] pyrimidine, M.P. 130° C., were obtained.

Analysis.—$C_{10}H_5ClN_2OS$; mol. wt 236.70. Calculated (percent): C, 50.75; H, 2.13; N, 11.82. Found (percent): C, 50.87; H, 2.19; N, 11.93.

EXAMPLE G 2-(2'-furyl)-4-morpholino-thieno[3,2-d]pyrimidine 15.0 gm. (0.063 mol) of 4-chloro-2-(2'-furyl)-thieno [3,2-d]pyrimidine, 100 ml. of ethanol and 30 ml. of morpholine were combined at room temperature. An exothermic reaction ensued, and a clear solution formed from which a crystalline substance precipitated after a short period of time. The resulting reaction mixture was refluxed for 30 minutes, then cooled and poured into water, and the precipitate formed thereby was collected by vacuum filtration, washed with water and recrystallized from ethanol. 15.0 gm. (83% of theory) of 2-(2'-furyl)-4-morpholino-thieno[3,2-d]pyrimidine, M.P. 140° C., were obtained.

Analysis.—$C_{14}H_{13}N_3O_2S$; mol. wt. 287.34. Calculated (percent): C, 58.50; H, 4.56; N, 14.63. Found (percent): C, 58.63; H, 4.64; N, 14.50.

The following compounds were prepared in analogous manner:

(a) 2-(2'-furyl)-4-[(β - acetylamino-ethyl) - amino]-thieno[3,2-d]pyrimidine, M.P. 204–205° C. (recrystallized from doixane), from 2-(2'-furyl)-4-chloro-thieno [3,2-d]pyrimidine and N-acetyl-ethylenediamine.

(b) 2-(2'-furyl)-4-methylamino - thieno[3,2-d]pyrimidine, M.P. 130–131° C. (recrystallized from ethyl acetate/petroleum ether), from 2-(2'-furyl)-4-chloro-thieno[3,2-d]pyrimidine and methylamine.

(c) 2-(2'-furyl)-4-[(β-methoxy - ethyl)-amino]-thieno [3,2-d]pyrimidine, M.P. 117–118° C. (recrystallized from gasoline), from 2-(2'-furyl)-4-chloro-thieno[3,2-d] pyrimidine and (β-methoxy-ethyl)-amine.

(d) 2-(2'-furyl)-4-[(β-hydroxy-n-propyl-amino]thieno [3,2-d]pyrimidine, M.P. 136–137° C. (recrystallized from ethyl acetate/petroleum ether), from 2-(2'-furyl)-4-chloro-thieno[3,2-d]pyrimidine and (β-hydroxy-n-propyl)-amine.

(e) 2-(2'-furyl)-4-[(β-hydroxy-ethyl) - amino]-thieno [3,2-d]pyrimidine, M.P. 182–183° C. (recrystallized from ethyl acetate/petroleum ether), from 2-(2'-furyl)-4-chloro-thieno[3,2-d]pyrimidine and (β-hydroxy-ethyl)-amine.

(f) 2-(2'-furyl)-4-[(β,γ - dihydroxy-n-propyl)amino]-thieno[3,2-d]pyrimidine, M.P. 119–121° C. (recrystallized from ethyl acetate) from 2-(2'-furyl)-4-chloro-thieno[3,2-d]pyrimidine and (β,γ-dihydroxy-n-propyl)-amine.

(g) 2-(2'-furyl)-4 - amino - thieno[3,2-d]pyrimidine, M.P. 224–225° C. (recrystallized from ethyl acetate), from 2-(2'-furyl)-4-chloro-thieno[3,2-d]pyrimidine and ammonia.

EXAMPLE H 2-(2'-furyl)-4-[(β-acetoxy-ethyl)-amino]-thieno [3,2-d]pyrimidine

A mixture of 2.6 gm. (0.01 mol) of 2-(2'-furyl)-4-[(β-hydroxy-ethyl)-amino]-thieno[3,2-d]pyrimidine and 20 ml. of acetic acid anhydride was heated for 90 minutes at 70° C. Thereafter, the resulting blue solution was evaporated in vacuo at 70° C., and the solid residue was recrystallized from ethyl acetate/hexane. 2.2 gm. (73% of theory) of 2 - (2' - furyl)-4-[(β-acetoxy-ethyl)-amino]-thieno[3,2-d]pyrimidine, M.P. 128–129° C., were obtained.

*Analysis.*—$C_{14}H_{13}N_3O_3S$; mol. wt. 303.34. Calculated (percent): C, 55.44; H, 4.32; N, 13.86. Found (percent): C, 55.39; H, 4.36; N, 13.98.

EXAMPLE I 2-(5'-bromo-2'-furyl)-4-morpholino-thieno[3,2-d] pyrimidine

While vigorously stirring and maintaining the temperature at 20° C., first 1.2 gm. (0.015 mol) of anhydrous sodium acetate and then, over a period of one hour, a solution of 1.6 gm. (0.01 mol) of bromine in 20 ml. of glacial acetic acid were added to a solution of 2.9 gm. (0.01 mol) of 2-(2'-furyl)-4-morpholino-thieno[3,2-d]pyrimidine in glacial acetic acid, and the resulting mixture was allowed to stand for 30 minutes more at 20° C. The reaction mixture was thereafter admixed with water, and the aqueous mixture was extracted three times with chloroform. The extract solutions were combined, washed with water, dried over sodium sulfate and evaporated in vacuo. The residue was purified by column-chromatography on silicagel (particle size 0.2–0.5 mm.), using a mixture of benzene and acetone (8:2) as the flow agent. 0.95 gm. (26% of theory) of 2-(5'-bromo-2'-furyl)-4-morpholino-thieno[3,2-d]pyrimidine, M.P. 145–146° C., were obtained.

*Analysis.*—$C_{14}H_{12}BrN_3O_2S$; mol. wt. 366.25. Calculated (percent): C, 45.92; H, 3.30; N, 11.47. Found (percent): C, 46.04; H, 3.38; N, 11.31.

The following compounds were prepared in analogous manner:

(a) 2 - (5' - bromo - 2'-furyl)-4-methylamino-thieno [3,2-d]pyrimidine, M.P. 144–146° C., from 2-(2'-furyl)-4-methylamino-thieno[3,2-d]pyrimidine and bromine.

(b) 2 - (5' - bromo - 2' - furyl) - 4 - [(β-methoxy-ethyl)-amino]thieno[3,2-d]pyrimidine, M.P. 135–136° C., from 2 - (2' - furyl) - 4 - [(β-methoxy-ethyl)-amino]-thieno[3,2-d]pyrimidine and bromine.

(c) 2 - (5' - bromo - 2' - furyl) - 4 - [(β - hydroxy-n-propyl) - amino] - thieno[3,2 - d]pyrimidine, M.P. 154–155° C., from 2 - (2' - furyl) - 4 - [(β-hydroxy - n-propyl) - amino] - thieno[3,2-d]pyrimidine and bromine.

(d) 2 - (5' - bromo - 2' - furyl) - 4 - [(β - hydroxyethyl) - amino] - thieno[3,2 - d]pyrimidine, M.P. 178–179° C., from 2 - (2' - furyl) - 4 - [(β - hydroxy - ethyl)-amino]-thieno[3,2-d]pyrimidine and bromine.

(e) 2 - (5' - bromo - 2' - furyl) - 4 - [(β,γ-dihydroxy-n- propyl) - amino] - thieno[3,2-d]pyrimidine, M.P. 148–150° C., from 2 - (2' - furyl) - 4 - [(β,γ - dihydroxy-n-propyl)-amino]-thieno[3,2-d]pyrimidine, M.P. 148–150° C. from 2-(2'-furl)-4-[β,γ-dihydroxy-n-propyl)-amino]-thieno[3,2-d]pyrimidine and bromine.

(f) 2 - (5' - bromo - 2' - furyl) - 4 - amino - thieno [3,2 - d]pyrimidine, M.P. 240° C. (decomp.), from 2-(2'-furyl) - 4 - amino - thieno[3,2-d]pyrimidine and bromine.

EXAMPLE J

A mixture of 1.3 gm. (0.006 mol) of 2-(2'-furyl)-4-amino-thieno[3,2-d]pyrimidine and 20 ml. of acetic acid anhydried was heated for 90 minutes at 120° C. Thereafter, the resulting clear solution was evaporated in vacuo, and the residue was recrystallized from acetone. 1.4 gm. (90% of theory) of 2-(2'-furyl)-4-acetylamino-thieno [3,2-d]pyrimidine, M.P. 173–174° C., were obtained.

*Analysis.*—$C_{12}H_9N_3O_2S$; mol. wt. 259.29. Calculated (percent): C, 55.63; H, 3.50; N, 16.21. Found (percent): C, 55.70; H, 3.58; N, 16.13.

EXAMPLE K 2-(5'-methoxycarbonyl-2'-furyl)-4-hydroxy-thieno [3,2-d]pyrimidine 1.8 gm. (0.01 mol) of 5-carbomethoxyfuran-2-iminocarboxylic acid methyl ester (M.P. 82–83° C.; prepared from 5-carbomethoxyfuran-2-carbonitrile, methanol and hydrochloric acid) and 1.7 gm. (0.11 mol) of 3-amino-thiophene-2-carboxylic acid methyl ester were intimately admixed with each other, and the mixture was heated for 4 hours at 150–160° C. After some time of heating, a crystalline substance began to separate out of the clear molten mass, and at the end of the reaction time the contents of the flask had completely solidified. The product was triturated with ethanol, the mixture was vacuum-filtered, and the filter cake was recrystallized from dimethylformamide, yielding 1.6 gm. (58% of theory) of 2 - (5' - methoxycarbonyl - 2' - furyl) - 4 - hydroxy-thieno[3,2-d]pyrimidine, M.P. >300° C.

*Analysis.*—$C_{12}H_8N_2O_4S$; mol. wt. 276.28. Calculated (percent): C, 52.16; H, 2.92; N, 10.14. Found (percent): C, 52.03; H, 2.99; N, 10.26.

EXAMPLE L 2-(5'-methoxycarbonyl-2'-furyl)-4-chloro-thieno [3,2-d]pyrimidine

A mixture consisting of 2.8 gm. (0.01 mol) of 2-(5'-methoxycarbonyl - 2' - furyl) - 4-hydroxy-thione[3,2-d]pyrimidine and 20 ml. of phosphorus oxychloride was refluxed for 90 minutes, whereby everything went into solution. Thereafter, the excess phosphorus oxychloride was distilled off in vacuo, and the residue was decomposed in ice water. The crystalline precipitate was collected by vacuum filtration, dried and recrystallized from a mixture of dimethylformamide and ethanol, yielding 2.1 gm. (71% of theory) of 2-(5'-methoxycarbonyl-2'-furyl)-4-chloro-thieno[3,2-d]pyrimidine, M.P. 234–135° C.

*Analysis.*—$C_{12}H_7ClN_2O_3S$; mol. wt. 294.73. Calculated (percent): C, 48.90; H, 2.38; N, 16.29; Cl. 12.03. Found (percent): C, 50.00; H, 2.41; N, 16.18; Cl, 11.91.

EXAMPLE M 2-(5'-carboxy-2'-furyl)-4-morpholino-thieno [3,2-d]pyrimidine (a) A mixture consisting of 2.9 gm. (0.01 mol) of 2 - (5' - methoxycarbonyl - 2' - furyl) - 4 - chloro-thieno [3,2-d]pyrimidine and 20 ml. of morpholine was heated for one hour at 100° C. Thereafter, the reaction solution was admixed with water, the precipitate formed thereby was collected by vacuum filtration, and the filter cake was washed with water and recrystallized from ethanol, yielding 2.9 gm. (72% of theory) of 2-(5'-carboxymorpholido-2' - furyl) - 4 - morpholino-thieno[3,2-d]pyrimidine, M.P. 225–227° C.

(b) A mixture consisting of 2.9 gm. of 2-(5'-carboxymorpholido-2'-furyl) - 4 - morpholino-thieno[3,2-d]pyrimidine and 15 ml. of concentrated hydrochloric acid was refluxed for 2 hours. Thereafter, the reaction solution was cooled and then admixed with an equal volume of water, the precipitate formed thereby was collected by vacuum filtration, and the filter cake was washed with a small amount of ice water and recrystallized from methanol, yielding 1.8 gm. (78% of theory) of 2-(5'-carboxy-2'-furyl) - 4 - morpholino-thieno[3,2-d]pyrimidine, M.P. 295° C. (decomp.).

Analysis.—C₁₅H₁₃N₃O₄S; mol. wt. 331.36. Calculated (percent): C, 54.37; H, 3.96; N, 12.68. Found (percent): C, 54.31; H, 4.07; N, 12.84.

Preparation of end products of the Formula I:

EXAMPLE 1

4[N-(β-hydroxy-ethyl)-ethylamino]-2-(5'-nitro-2'-furyl)-thieno[3,2-d]pyrimidine by method A A solution of 3.6 gm. (0.036 mol) of 2-ethylamino-ethanol-(1) in 10 ml. of dimethylsulfoxide was added dropwise to a stirred suspension of 5.0 gm. (0.018 mol) of 4-chloro-2-(5'-nitro-2'-furyl)-thieno[3,2-d]pyrimidine in 50 ml. of dimethylsulfoxide at 80° C. Thereafter, the reaction mixture was stirred for one hour at 80° C., whereby a clear solution was formed which was allowed to cool. The cool solution was poured into water, the precipitate formed thereby was collected by vacuum filtration, and the filter cake was washed with water and recrystallized from a mixture of dimethylformamide and ethanol. 4.6 gm. (74% of theory) of 4-[N-(β-hydroxy-ethyl)-ethylamino] - 2 - (5'-nitro-2'-furyl) - thieno[3,2-d]pyrimidine, M.P. 207–208° C., of the formula

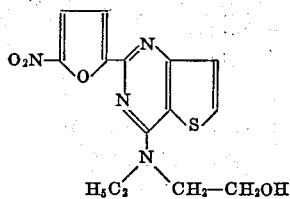

were obtained.

Analysis.—C₁₄H₁₄N₄O₄S; mol. wt. 334.36. Calculated (percent): C, 50.28; H, 4.22; N, 16.76. Found (percent): C, 50.30; H, 4.23; N, 16.69.

EXAMPLE 2

Using a procedure analogous to that described in Example 1, 4 - amino - 2-(5'-nitro-2'-furyl)-thieno[3,2-d]pyrimidine, M.P. >300° C. (recrystallized from dimethylformamide), of the formula

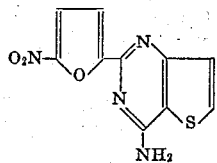

was prepared from 4-chloro-2-(5'-nitro-2'-furyl)-thieno[3,2-d]pyrimidine and ammonia.

EXAMPLE 3

Using a procedure analogous to that described in Example 1, 4-methylamino - 2 - (5'-nitro-2'-furyl)-thieno[3,2-d]pyrimidine, M.P. 263–264° C. (recrystallized from ethanol/dimethylformamide), of the formula

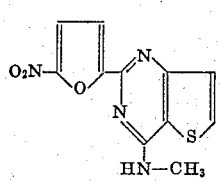

was prepared from 4-chloro-2-(5'-nitro-2'-furyl)thieno[3,2-d]pyrimidine and methylamine.

EXAMPLE 4

Using a procedure analogous to that described in Example 1, 4-ethylamino-2-(5'-nitro-2'-furyl)-thieno[3,2-d]pyrimidine, M.P. 178–179° C. (recrystallized from methanol/dimethylformamide), was prepared from 4-chloro-2-(5'-nitro-2'-furyl) - thieno3,2-d]pyrimidine and ethylamine.

EXAMPLE 5

Using a procedure analogous to that described in Example 1, 4 - isopropylamino-2-(5'-nitro-2'-furyl)-thieno[3,2-d]pyrimidine, M.P. 197° C. (recrystallized from ethanol), was prepared from 4-chloro-2-(5'-nitro-2'-furyl)-thieno[3,2-d]pyrimidine and isopropylamine.

EXAMPLE 6

Using a procedure analogous to that described in Example 1, 4-n-butylamino - 2 - (5'-nitro-2'-furyl)-thieno[3,2-d]pyrimidine, M.P. 179–180° C. (recrystallized from ehtanol), was prepared from 4-chloro-2-(5'-nitro-2'-furyl)-thieno[3,2-d]pyrimidine and n-butylamine.

EXAMPLE 7

Using a procedure analogous to that described in Example 1, 4 - n - amylamino-2-(5'-nitro-2'-furyl)-theno[3,2-d]pyrimidine, M.P. 141.142° C. (recrystallized from ethanol/water), was prepared from 4-chloro-2-(5'-nitro-2'-furyl)thieno[3,2-d]pyrimidine and n-amylamine.

EXAMPLE 8

Using a procedure analogous to that described in Example 1, 4-allylamino - 2 - (5'-nitro-2'-furyl)-thieno[3,2-d]pyrimidine, M.P. 191–193° C. (recrystallized from ethanol), of the formula

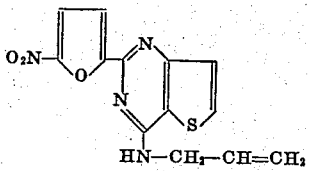

was prepared from 4-chloro-2-(5'-nitro-2'-furyl)thieno[3,2-d]pyrimidine and allylamine.

EXAMPLE 9

Using a procedure analogous to that described in Example 1, 4-dimethylamino-2-(5'-nitro-2'-furyl)-thieno[3,2-d]pyrimidine, M.P. 256–258° C. (recrystallized from dimethylformamide), of the formula

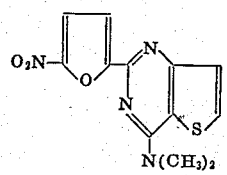

was prepared from 4-chloro-2-(5'-nitro-2'-furyl)-thieno[3,2-d]pyrimidine and dimethylamine.

EXAMPLE 10

Using a procedure analogous to that described in Example 1, 4 - di - n - butylamino-2-(5'-nitro-2'-furyl)-thieno[3,2-d]pyrimidine, M.P. 125–127° C. (recrystallized from ethanol), was prepared from 4-chloro-2-(5'-nitro-2'-furyl)-thieno[3,2-d]pyrimidine and di-n-butylamine.

EXAMPLE 11

Using a procedure analogous to that described in Example 1, 4-(β-hydroxyethyl-amino) - 2 - (5'-nitro-2'-furyl)- thieno[3,2-d]pyrimidine, M.P. 174–175° C. (recrystallized from ethanol), of the formula

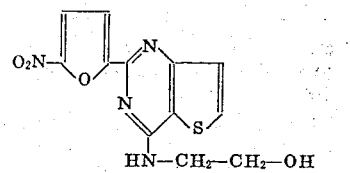

was prepared from 4-chloro-2-(5'-nitro-2'-furyl)-thieno[3,2-d]pyrimidine and β-hydroxyethyl-amine.

EXAMPLE 12

Using a procedure analogous to that described in Example 1, 4-[(3' - hydroxy - p - propyl)-amino]-2-(5''-nitro-2''-furyl)-thieno[3,2-d]pyrimidine, M.P. 180–181° C. (recrystallized from ethanol), was prepared from 4-chloro-2-(5'-nitro-2'-furyl)-thieno[3,2-d]pyrimidine and 3-amino-1-propanol.

EXAMPLE 13

Using a procedure analogous to that described in Example 1, 4-[(4'-hydroxy - n - butyl)-amino]-2-(5''-nitro-2''-furyl)-thieno[3,2-d]pyrimidine, M.P. 165–166° C. (recrystallized from methanol/water), was prepared from 4-chloro - 2 - (5'-nitro - 2' - furyl)-thieno[3,2-d]pyrimidine and 4-amino-1-butanol.

EXAMPLE 14

Using a procedure analogous to that described in Example 1, 4-[(5'-hydroxy - n - pentyl)-amino]-2-(5''-nitro-2''-furyl)-thieno[3,2-d]pyrimidine, M.P. 137–138° C. (recrystallized from ethanol/water), was prepared from 4-chloro - 2 - (5'-nitro - 2' - furyl)-thieno[3,2-d]pyrimidine and 5-amino-1-pentanol.

EXAMPLE 15

Using a procedure analogous to that described in Example 1, 4-[(2'-hydroxy - n - propyl)-amino]-2-(5''-nitro-2''-furyl)-thieno[3,2-d]pyrimidine, M.P. 192–193° C. (recrystallized from ethanol), was prepared from 4-chloro-2-(5'-nitro-2'-furyl)-thieno[3,2-d]pyrimidine and 1-amino-2-propanol.

EXAMPLE 16

Using a procedure analogous to that described in Example 1, 4-[(2',3'-dihydroxy-n-propyl)-amino]-2-(5''-nitro-2''-furyl)-thieno[3,2-d]pyrimidine, M.P. 179–180° C. (recrystallized from methanol), was prepared from 4-chloro-2-(5'-nitro-2'-furyl)-thieno[3,2-d]pyrimidine and 1-amino-2,3-propanediol.

EXAMPLE 17

Using a procedure analogous to that described in Example 1, 4-[(2'-methoxy-ethyl) - amino] - 2 - (5''-nitro-2''-furyl)-thieno[3,2-d]pyrimidine, M.P. 151–152° C. (recrystallized from methanol), of the formula

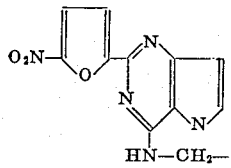

was prepared from 4-chloro-2-(5'-nitro-2'-furyl)-thieno[3,2-d]pyrimidine and β-methoxyethyl-amine.

EXAMPLE 18

Using a procedure analogous to that described in Example 1, 4-[(2'-ethoxy-ethyl)-amino] - 2 - (5''-nitro-2''-furyl)-thieno[3,2-d]pyrimidine, M.P. 129–130° C. (recrystallized from ethanol/water), was prepared from 4-chloro - 2 - (5'-nitro-2'-furyl)-thieno[3,2-d]pyrimidine and 2-ethoxyethyl-amine.

EXAMPLE 19

Using a procedure analogous to that described in Example 1, 4-[(3'-methoxy-n-propyl)-amino]-2-(5'''-nitro-2''-furyl)-thieno[3,2-d]pyrimidine, M.P. 133–134° C. (recrystallized from methanol/water), was prepared from 4-chloro-2-(5'-nitro-2'-furyl)-thieno[3,2 - d] - pyrimidine and (3-methoxy-n-propyl)-amine.

EXAMPLE 20

Using a procedure analogous to that described in Example 1, 4-[N-(β-hydroxy-ethyl)-methylamino] - 2 - (5'-nitro-2'-furyl)-thieno[3,2-d]pyrimidine, M.P. 204–205° C. (recrystallized from ethanol/dimethylformamide), was prepared from 4 - chloro-2-(5'-nitro-2'-furyl)-thieno[3,2-d]pyrimidine and N-(β-hydroxy-ethyl)-methylamine.

EXAMPLE 21

Using a procedure analogous to that described in Example 1, 4-[N-(β-hydroxy - ethyl)-n-butylamino]-2-(5'-nitro-2'-furyl)-thieno[3,2-d]pyrimidine, M.P. 148–149° C. (recrystallized from ethanol), was prepared from 4-chloro-2-(5'-nitro-2'-furyl) - thieno[3,3-d]pyrimidine and N-(β-hydroxy-ethyl)-n-butylamine.

EXAMPLE 22

Using a procedure analogous to that described in Example 1, 4-[N-(γ-hydroxy-n-propyl)-methylamino]-2-(5'-nitro-2'-furyl)-thieno[3,2-d]pyrimidine, M.P. 154–155° C. (recrystallized from ethanol), was prepared from 4-chloro-2-(5'nitro-2'-furyl) - thieno[3,2-d]pyrimidine and N-(γ-hydroxy-n-propyl)-methylamine.

EXAMPLE 23

Using a procedure analogous to that described in Example 1, 4(N-methyl-D-glucamino)-2-(5'-nitro-2'-furyl)-thieno[3,2-d]pyrimidine, M.P. 16–168° C. (recrystallized from water), of the formula

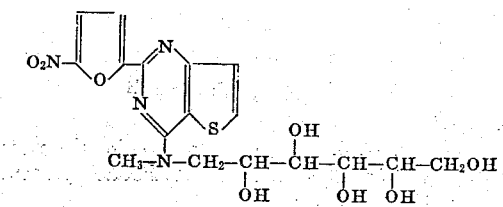

was prepared from 4-chloro-2-(5'-nitro-2'-furyl)-thieno[3,2-d]pyrmidine and N-methyl-D-glucamine.

EXAMPLE 24

Using a procedure analogous to that described in Example 1, 4-[bis-(β-hydroxy-ethyl)-amino]-2-(5'-nitro-2-'furyl)-thieno[3,2-d]pyrimidine, M.P. 220° C. (recrystallized from ethanol), of the formula

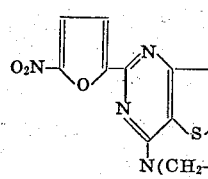

was prepared from 4-chloro-2-(5'-nitro-2'-furyl)-thieno[3,2-d]pyrimidine and bis-(β-hydroxy-ethyl)-amine.

EXAMPLE 25

Using a procedure analogous to that described in Example 1, 4-[N-(β-hydroxy-ethyl)-N-(γ-hydroxy-n-propyl)-amino]-2-(5'-nitro - 2' - furyl)-thieno[3,2-d[pyrimidine, M.P. 197–198° C. (recrystallized from methanol/dimethylformamide), was prepared from 4-chloro-2-(5'-nitro - 2' - furyl)-thieno[3,2-d]pyrimidine and 3-[(β-hydroxy-ethyl)-amino]-1-propanol.

EXAMPLE 26

Using a procedure analogous to that described in Example 1, 4-[bis-(γ-hydroxy-n-propyl)-amino]-2-(5'-nitro-2'-furyl)-thieno[3,2-d]pyrimidine, M.P. 188–189° C. (recrystallized from ethanol), was prepared from 4-chloro-2-(5'-nitro-2'-furyl) - thieno[3,2-d]pyrimidine and bis-(γ-hydroxy-n-propyl)-amine.

EXAMPLE 27

Using a procedure analogous to that described in Example 1, 4-[bis-(5'-hydroxy-n-pentyl)-amino]-2-(5"-nitro-2"-furyl)-thieno[3,2-d]pyrimidine, M.P. 114–115° C. (recrystallized from ethanol/water), was prepared from 4-chloro-2-(5'-nitro-2'furyl)-thieno[3,2-d]pyrimidine and bis(5'-hydroxy-n-pentyl)-amine.

EXAMPLE 28

Using a procedure analogous to that described in Example 1, 4-[N-(β-hydroxy-ethyl)-N-(2'-hydroxy-n-propyl)-amino]-2-(5"-nitro-2"-furyl) - thieno[3,2-d]pyrimidine, M.P. 210–211° C. (recrystallized from ethanol), was prepared from 4-chloro-2-(5'-nitro-2'-furyl)-thieno[3,2-d]pyrimidine and 1-[(β-hydroxy-ethyl)-amino] - 2-propanol.

EXAMPLE 29

Using a procedure analogous to that described in Example 1, 4-[bis-(2'-hydroxy-n-propyl)-amino]-2-(5'-nitro-2'-furyl)-thieno[3,2-d]pyrimidine, M.P. 208–209° C. (recrystallized from acetone), was prepared from 4-chloro-2-(5'-nitro-2'-furyl)-thieno[3,2 - d]pyrimidine and bis-(2-hydroxy-n-propyl)-amine.

EXAMPLE 30

Using a procedure analogous to that described in Example 1, 4-[bis-(β-methoxy-ethyl)-amino]-2-(5'-nitro-2'-furyl)-thieno[3,2-d]pyrimidine, M.P. 128–129° C. (recrystallized from methanol), of the formula

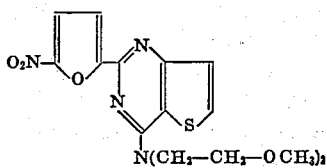

was prepared from 4-chloro-2-(5'-nitro-2'-furyl)-thieno[3,2-d]pyrimidine and bis-(β-methoxy-ethyl)-amine.

EXAMPLE 31

Using a procedure analogous to that described in Example 1, 4 - cyclohexylamino-2-(5'-nitro-2'-furyl)-thieno[3,2-d]pyrimidine, M.P. 183–184° C. (recrystallized from ethanol), of the formula

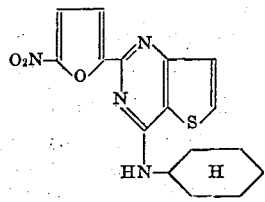

was prepared from 4-chloro-2-(5'-nitro-2'-furyl)-thieno[3.2-d]pyrimidine and cyclohexylamine.

EXAMPLE 32

Using a procedure analogous to that described in Example 1, 4-piperidino-2-(5'-nitro-2'-furyl)-thieno[3,2-d]pyrimidine, M.P. 196–198° C. (recrystallized from ethanol), of the formula

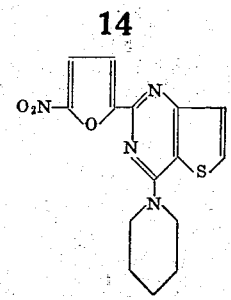

was prepared from 4-chloro-2-(5'-nitro-2'-furyl)-thieno[3,2-d]pyrimidine and piperidine.

EXAMPLE 33

Using a procedure analogous to that described in Example, 1, 4 - (3' - hydroxy - piperidino)-2-(5"-nitro-2"-furyl)-thieno[3,2-d]pyrimidine, M.P. 214–215° C. (recrystallized from ethanol), of the formula

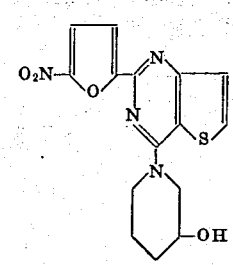

was prepared from 4-chloro-2-(5'-nitro-2'-furyl)-thieno[3,2-d]pyrimidine and 3-hydroxy-piperidine.

EXAMPLE 34

Using a procedure analogous to that described in Example 1, 4-(4' - hydroxy - piperidino) - 2 - (5' - nitro-2'-furyl)-thieno[3,2-d]pyrimidine, M.P. 211–212° C. (recrystallized from ethanol/dimethylformamide), was prepared from 4 - chloro-2-(5'-nitro-2'-furyl)-thieno[3,2-d]pyrimidine and 4-hydroxy-piperidine.

EXAMPLE 35

Using a procedure analogous to that described in Example 1, 4-(N - methyl - piperazino) - 2 - (5" - nitro-2"-furyl)-thieno[3,2-d]pyrimidine, M.P. 178–179° C. (recrystallized from ethanol), of the formula

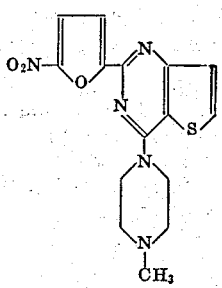

was prepared from 4-chloro-2-(5'-nitro-2'-furyl)-thieno[3,2-d]pyrimidine and N-methyl-piperazine.

EXAMPLE 36

Using a procedure analogous to that described in Example 1, 4-[N'-(β-hydroxy-ethyl)-piperazino] - 2 - (5"- nitro-2''-furyl)-thieno[3,2-d]pyrimidine, M.P. 186–187° C. (recrystallized from ethanol), of the formula

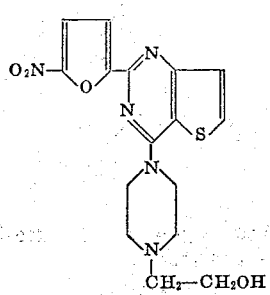

was prepared from 4-chloro-2-(5'-nitro-2'-furyl)-thieno[3,2-d]pyrimidine and N-(β-hydroxy-ethyl)-piperazine.

EXAMPLE 37

Using a procedure analogous to that described in Example 1, 4-pyrrolidino-2-(5'-nitro-2'-furyl)-thieno[3,2-d]pyrimidine, M.P. 203–204° C. (recrystallized from ethanol), of the formula

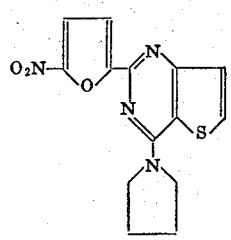

was prepared from 4-chloro-2-(5'-nitro-2'-furyl)-thieno[3,2-d]pyrimidine and pyrrolidine.

EXAMPLE 38

Using a procedure analogous to that described in Example 1, 4-[(β-dimethylamino-ethyl)-amino]-2-(5'-nitro-2'-furyl)-thieno[3,2-d]pyrimidine, M.P. 144–145° C. (recrystallized from methanol/water), of the formula

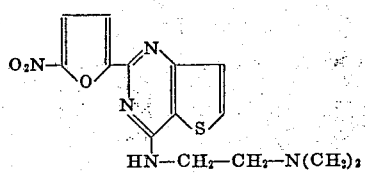

was prepared from 4-chloro-2-(5'-nitro-2'-furyl)-thieno[3,2-d]pyrimidine and (β-dimethylamino-ethyl)-amine.

EXAMPLE 39

Using a procedure analogous to that described in Example I, 4-[(β-diethylamino-ethyl)-amino]-2-(5'-nitro-2'-furyl)-thieno[3,2-d]pyrimidine, M.P. 103–104° C. (recrystallized from ethanol/water), was prepared from 4-chloro-2-(5'-nitro-2'-furyl)-thieno[3,2-d]pyrimidine and (β-diethylamino-ethyl)-amine.

EXAMPLE 40

Using a procedure analogous to that described in Example I, 4-[(γ-diethylamino-n-propyl)amino]-2-(5'-nitro-2'-furyl)-thieno[3,2-d]pyrimidine, M.P. 127–128° C. (recrystallized from ethanol/water), was prepared from 4-chloro-2-(5'-nitro-2'-furyl)-thieno[3,2-d]pyrimidine and (γ-diethylamino-n-propyl)-amine.

EXAMPLE 41

Using a procedure analogous to that described in Example 1, 4-piperazino-2-(5'-nitro-2'-furyl)-thieno[3,2-d]pyrimidine, M.P. 203–205° C. (recrystallized from dimethylformamide), of the formula

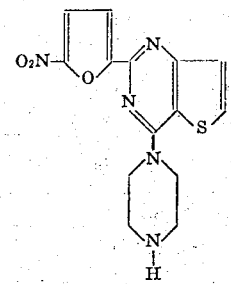

was prepared from 4-chloro-2-(5'-nitro-2'-furyl)-thieno[3,2-d]pyrimidine and piperazine.

EXAMPLE 42

Using a procedure analogous to that described in Example 1, 4-(N'-formyl-piperazino)-2-(5'-nitro-2'-furyl)-thieno[3,2-d]pyrimidine, M.P. 278° C. (recrystallized from dimethylformamide), of the formula

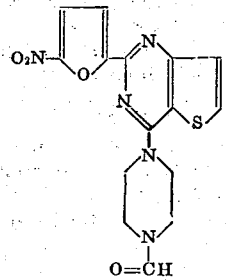

was prepared from 4-chloro-2-(5'-nitro-2'-furyl)-thieno[3,2-d]pyrimidine and N-formyl-piperazine.

EXAMPLE 43

Using a procedure analogous to that described in Example 1, 4-(N'-carbethoxy-piperazino)-2-(5'-nitro-2'-furyl)-thieno[3,2-d]pyrimidine, M.P. 218° C. (recrystallized from dimethylformamide), of the formula

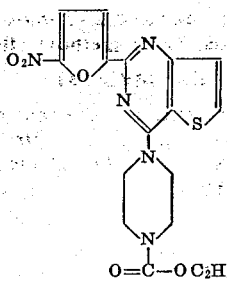

was prepared from 4-chloro-2-(5'-nitro-2'-furyl)-thieno[3,2-d]pyrimidine and N-carbethoxy-piperazine.

EXAMPLE 44

Using a procedure analogous to that described in Example 1, 4-benzylamino-2-(5'-nitro-2'-furyl)-thieno[3,2-d]pyrimidine, M.P. 162° C. (recrystallized from ethyl acetate), of the formula

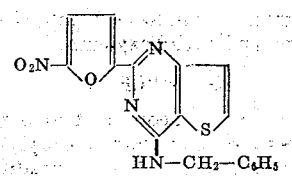

was prepared from 4-chloro-2-(5'-nitro-2'-furyl)-thieno[3,2-d]pyrimidine and benzylamine.

EXAMPLE 45

Using a procedure analogous to that described in Example 1, 4 - (β - phenethyl-amino)-2-(5'-nitro-2'-furyl)-thieno[3,2-d]pyrimidine, M.P. 165° C. (recrystallized from ethylacetate), was prepared from 4-chloro-2-(5'-nitro-2'-furyl)-thieno[3,2-d]pyrimidine and β-phenethyl-amine.

EXAMPLE 46

Using a procedure analogous to that described in Example 1, 4-anilino-2-(5'-nitro-2'-furyl)-thieno[3,2-d] pyrimidine, M.P. 162–164° C. (recrystallized from ethyl acetate), of the formula

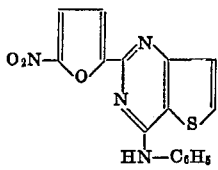

was prepared from 4-chloro-2-(5'-nitro-2'-furyl)thieno[3,2-d]pyrimidine and aniline.

EXAMPLE 47

Using a procedure analogous to that described in Example 1, 4-(p-chloro-anilino)-2-(5'-nitro-2'-furyl)-thieno[3,2-d]pyrimidine, M.P. 262° C. (recrystallized from ethyl acetate), of the formula

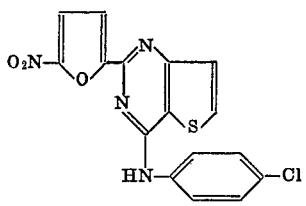

was prepared from 4-chloro-2-(5'-nitro-2'-furyl)-thieno[3,2-d]pyrimidine and p-chloro-aniline.

EXAMPLE 48

Using a procedure analogous to that described in Example 1, 4-(o-chloro-anilino)-2-(5'-nitro-2'-furyl)thieno[3,2-d]pyrimidine, M.P. 238–240° C. (recrystallized from ethyl acetate), was prepared from 4-chloro-2-(5'-nitro-2'-furyl)-thieno[3,2-d]pyrimidine and o-chloro-aniline.

EXAMPLE 49

Using a procedure analogous to that described in Example 1, 4-(m-chloro-anilino)-2-(5'-nitro-2'-furyl)thieno[3,2-d]pyrimidine, M.P. 257–258° C. (recrystallized from ethyl acetate), was prepared from 4-chloro-2-(5'-nitro-2'-furyl)-thieno[3,2-d]pyrimidine and m-chloro-aniline.

EXAMPLE 50

Using a procedure analogous to that described in Example 1, 4 - (p - methoxy-anilino)-2-(5'-nitro-2'-furyl)-thieno[3,2-d]pyrimidine, M.P. 211–212° C. (recrystallized from ethyl acetate), of the formula

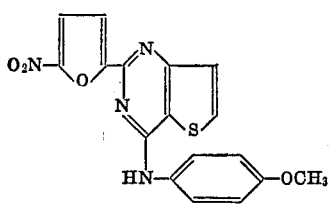

was prepared from 4-chloro-2-(5'-nitro-2'-furyl)-thieno[3,2-d]pyrimidine and p-methoxy-aniline.

EXAMPLE 51

Using a procedure analogous to that described in Example 1, 4-(p-methyl-anilino)-2-(5'-nitro-2'-furyl)-thieno[3,2-d]pyrimidine, M.P. 224–226° C. (recrystallized from ethyl acetate), of the formula

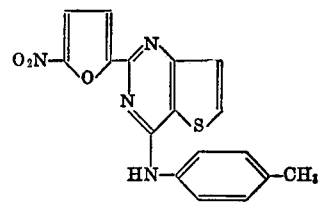

was prepared from 4-chloro-2-(5'-nitro-2'-furyl)-thieno[3,2-d]pyrimidine and p-methyl-aniline.

EXAMPLE 52

Using a procedure analogous to that described in Example 1, 4-(p-hydroxy-anilino)-2-(5'-nitro-2'-furyl)-thieno[3,2-d]pyrimidine, M.P. 268° C. (recrystallized from ethyl acetate), of the formula

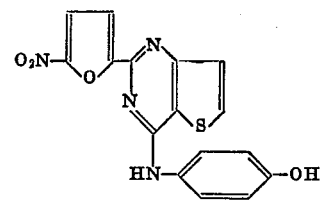

was prepared from 4-chloro-2-(5'-nitro-2'-furyl)-thieno[3,2-d]pyrimidine and p-amino-phenol.

EXAMPLE 53

Using a procedure analogous to that described in Example 1, 4 - (m - hydroxy-anilino)-2-(5'-nitro-2'-furyl)-thieno[3,2-d]pyrimidine, M.P. 282° C. (recrystallized from ethyl acetate), was prepared from 4-chloro-2-(5'-nitro - 2' - furyl)-thieno[3,2-d]pyrimidine and n-amino-phenol.

EXAMPLE 54

Using a procedure analogous to that described in Example 1, 4-(o-hydroxy-anilino)-2-(5'-nitro-2'-furyl-thieno[3,2-d]pyrimidine, M.P. 244° C. (recrystallized from ethyl acetate), was prepared from 4-chloro-2-(5'-nitro-2'-furyl)-thieno[3,2-d]pyrimidine and o-amino-phenol.

EXAMPLE 55

Using a procedure analogous to that described in Example 1, 4-(N-methyl-anilino) - 2-(5'-nitro-2'-furyl)-thieno-[3,2-d]pyrimidine, M.P. 201–202° C. (recrystallized from ethyl acetate), of the formula

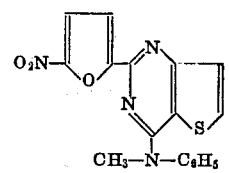

was prepared from 4 - chloro-2-(5'-nitro-2'-furyl)-thieno-[3,2-d]pyrimidine and N-methyl-aniline.

EXAMPLE 56

Using a procedure analogous to that described in Example 1, 4-(β-hydroxyethyl-amino)-6-methyl-2-(5'-nitro-2'-furyl)-thieno[3,2-d]pyrimidine, M.P. 189–190° C. (recrystallized from ethanol), of the formula

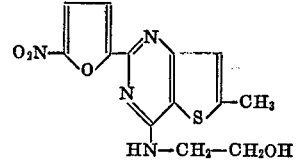

was prepared from 4-chloro-6-methyl-2-(5'-nitro-2'-furyl)-thieno[3,2-d]pyrimidine and 2-amino-ethanol.

EXAMPLE 57

Using a procedure analogous to that described in Example 1, 4-[bis(β-hydroxy-ethyl)-amino] - 6 - methyl - 2-(5'-nitro-2'-furyl)-thieno[3,2-d]pyrimidine, M.P. 187–188° C. (recrystallized from ethanol), was prepared from 4-chloro-6-methyl - 2 - (5'-nitro-2'-furyl)-thieno[3,2-d]pyrimidine and bis-(β-hydroxy-ethyl)-amine.

EXAMPLE 58

Using a procedure analogous to that described in Example 1, 4-amino-6-methyl-2-(5'-nitro-2'-furyl)-thieno-[3,2-d]pyrimidine, M.P. >300° C. (recrystallized from dimethylformamide), was prepared from 4-chloro-6-methyl-2-(5'-nitro-2'-furyl)-thieno[3,2-d]pyrimidine and ammonia.

EXAMPLE 59

Using a procedure analogous to that described in Example 1, 4-methylamino-6-methyl-2-(5'-nitro-2'-furyl)-thieno[3,2-d]pyrimidine, M.P. 231–233° C. (recrystallized from ethanol), was prepared from 4-chloro-6-methyl-2-(5' - nitro - 2' - furyl)-thieno[3,2-d]pyrimidine and methylamine.

EXAMPLE 60

Using a procedure analogous to that described in Example 1, 4-[(2',3'-dihydroxy-n-propyl)-amino]-6-methyl-2-(5''-nitro - 2'' - furyl) - thienol[3,2-d]pyrimidine, M.P. 210–211° C. (recrystallized from ethanol), of the formula

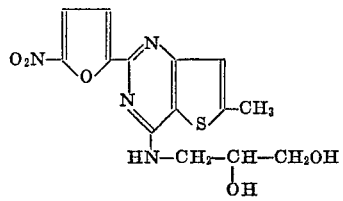

was prepared from 4-chloro-6-methyl-2-(5'-nitro-2'-furyl)-thieno[3,2-d]pyrimidine and 1-amino-2,3-propanediol.

EXAMPLE 61

Using a procedure analogous to that described in Example 1, 4-[(β - methoxy-ethyl) - amino] - 6 - methyl-2-(5'-nitro-2'-furyl) - thieno[3,2-d]pyrimidine, M.P. 174–175° C. (recrystallized from dimethylformamide methylene chloride), was prepared from 4-chloro-6-methyl-2-(5'-nitro-2'-furyl)-thieno[3,2-d]pyrimidine and β - methoxy-ethyl-amine.

EXAMPLE 62

Using a procedure analogous to that described in Example 1, 4-[N'-(β-hydroxy-ethyl)-piperazino]-6-methyl-2-(5'' - nitro - 2''-furyl)-thieno[3,2-d]pyrimidine, M.P. 180–181° C. (recrystallized from ethylacetate/dimethylformamide), was prepared from 4-chloro-6-methyl-2-(5'-nitro-2'-furyl) - thieno[3,2-d]pyrimidine and N-(β-hydroxy-ethyl)-piperazine.

EXAMPLE 63

Using a procedure analogous to that described in Example 1, 4-[(2'-hydroxy-1'-methyl-ethyl)-amino]-2-(5''-nitro-2''-furyl) - thieno[3,2-d]pyrimidine, M.P. 205–206° C. (recrystallized from ethanol), of the formula

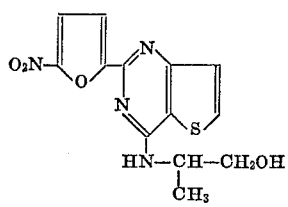

was prepared from 4-chloro-2-(5'-nitro-2'-furyl)-thieno[3,2-d]pyrimidine and 1-hydroxy-2-amino-propane.

EXAMPLE 64

Using a procedure analogous to that described in Example 1, 4-[(β-hydroxy-β-phenyl-ethyl)-amino]-2-(5'-nitro-2'-furyl)-thieno[3,2-d]pyrimidine, M.P. 188–189° C. (recrystallized from ethanol), of the formula

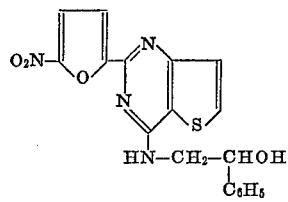

was prepared from 4-chloro-2-(5'-nitro-2'-furyl)-thieno[3,2-d]pyrimidine and (2-hydroxy-2-phenyl-ethyl)-amine.

EXAMPLE 65

Using a procedure analogous to that described in Example 1, 4-[(2'-hydroxy-cyclohexyl)-amino]-2-(5''-nitro-2''-furyl)-thieno[3,2-d]pyrimidine, M.P. 137–138° C. (recrystallized from ethanol/water), of the formula

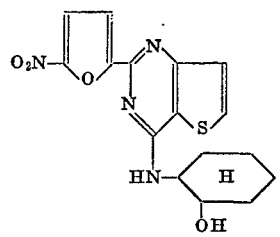

was prepared from 4-chloro-2-(5'-nitro-2'-furyl)-thieno[3,2-d]pyrimidine and (2-hydroxy-cyclohexyl)-amine.

EXAMPLE 66

Using a procedure analogous to that described in Example 1, 4-[(4'-hydroxy-cyclohexyl)-amino]-2-(5''-nitro-2''-furyl)-thieno[3,2-d]pyrimidine, M.P. 226–228° C. (recrystallized from tetrahydrofuran/water), was prepared from 4-chloro - 2-(5'-nitro-2'-furyl)-thieno[3,2-d]pyrimidine and (4-hydroxy-cyclohexyl)-amine.

EXAMPLE 67

Using a procedure analogous to that described in Example 1, 4-thiomorpholino - 2 - (5' - nitro - 2' - furyl)-thieno[3,2-d]pyrimidine, M.P. 205–207° C. (recrystallized from ethyl acetate), of the formula

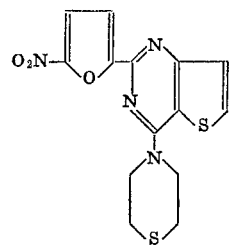

was prepared from 4-chloro-2-(5'-nitro-2'-furyl)-thieno[3,2-d]pyrimidine and thiomorpholine.

EXAMPLE 68

Using a procedure analogous to that described in Example 1, 4-(thiomorpholino - 1 - oxide)-2-(5'-nitro-2'-furyl)- thieno[3,2-d]pyrimidine, M.P. 280° C. (decomp.; recrystallized from dimethylsulfoxide), of the formula

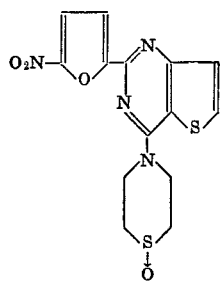

was prepared from 4-chloro-2-(5'-nitro-2'-furyl)-thieno[3,2-d]pyrimidine and thiomorpholine-1-oxide.

EXAMPLE 69

Using a procedure analogous to that described in Example 1, 4 - [(3' - dimethylamino-n-propyl)-amino] - 2-(5''-nitro-2''-furyl)-thieno[3,2-d]pyrimidine, M.P. 119–120.° C. (recrystallized from ethyl acetate), of the formula

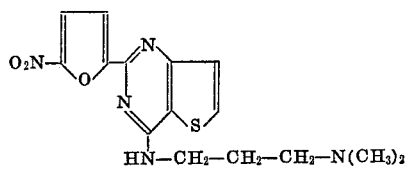

was prepared from 4-chloro-2-(5'-nitro-2'-furyl)-thieno[3,2-d]pyrimidine and (3 - dimethylamino - n - propyl)-amine.

EXAMPLE 70

Using a procedure analogous to that described in Example 1, 4-[(3'-diethylamino-2'-hydroxy-n-propyl)-amino]-2-(5''-nitro-2''-furyl)-thieno[3,2-d]pyrimidine, M.P. 150–152° C. (recrystallized from ethanol/water), was prepared from 4-chloro - 2 - (5'-nitro-2'-furyl)-thieno[3,2-d]pyrimidine and (3 - diethylamine - 2 - hydroxy-n-propyl)-amine.

EXAMPLE 71

4-diethylamino-2-(5'-nitro-2'-furyl)-thieno[3,2-d]pyrimidine by Method A

A solution of 0.75 gm. (0.01 mol) of diethylamine in 25 ml. of dimethylsulfoxide was added dropwise to a stirred suspension of 2.9 gm. (0.01 mol) of 4-methylmercapto-2-(5'-nitro-2'-furyl)-thieno[3,2-d]pyrimidine in 25 ml. of dimethylsulfoxide at 120° C. The reaction mixture was then stirred for two hours at 120° C., whereby methylmercaptan escaped and a clear solution gradually formed, the solution was allowed to cool and was then poured into ice water, the precipitate formed thereby was collected by vacuum filtration, and the filter cake was washed with water and recrystallized from ethanol. 1.3 gm. (41% of theory) of 4-diethylamino - 2 - (5' - nitro-2'-furyl)-thieno[3,2-d]pyrimidine, M.P. 128–129° C., of the formula

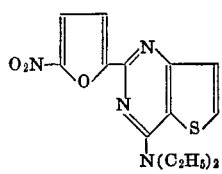

were obtained.

Analysis.—$C_{14}H_{14}N_4O_3S$; mol. wt. 318.38. Calculated (percent): C, 52.81; H, 4.43; N, 17.60. Found (percent): C, 52.80; H, 4.52; N, 17.45.

EXAMPLE 72

4-[(β-acetylamino-ethyl)-amino]-2-(5'-nitro-2'-furyl)-thieno[3,2-d]pyrimidine by Method A A solution of 3.6 gm. (0.036 mol) of N-acetylethylenediamine in 10 ml. of dimethylsulfoxide was slowly added dropwise to a stirred suspension of 5.0 gm. (0.018 mol) of 4-chloro-2-(5'-nitro - 2'-furyl)-thieno[3,2-d]pyrimidine in 50 ml. of dimethylsulfoxide at 80° C. Thereafter, the reaction mixture was stirred for 90 minutes at 80° C., whereby a clear solution was formed, and allowed to cool. The cool solution was poured into ice water, the precipitate formed thereby was collected by vacuum filtration, and the filter cake was washed with water and then recrystallized from a mixture of methanol and dimethylformamide. 5.0 gm. (81% of theory) of the compound of the formula

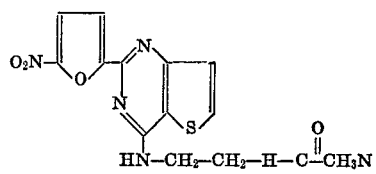

M.P. 241–242° C., were obtained.

Analysis.—$C_{14}H_{13}N_5O_4S$; mol wt. 347.36. Calculated (percent): C, 48.41; H, 3.78; N, 20.16. Found (percent): C, 48.33; H, 3.80; N, 20.15.

EXAMPLE 73

Using a procedure analogous to that described in Example 72, 4-[(3'-acetylamino-n-propyl)-amino]-2-(5''-nitro-2''-furyl)-thieno[3,2-d]pyrimidine, M.P. 187° C. (recrystallized from ethanol), was prepared from 4-chloro-2-(5'-nitro-2'-furyl)-thieno[3,2-d]pyrimidine and (3-acetylamino-n-propyl)-amine.

EXAMPLE 74

Using a procedure analogous to that described in Example 1, 4-[(β-acetylamino-ethyl)-amino]-6-methyl-2-(5'-nitro-2'-furyl)-thieno[3,2-d]pyrimidine, M.P. 239–240° C. (recrystallized from dimethylformamide), was prepared from 4-chloro-6-methyl-2-(5'-nitro-2'-furyl)-thieno[3,2-d]pyrimidine and N-acetyl-ethylenediamine.

EXAMPLE 75

4 - morpholino-2-(5'-nitro-2'-furyl)-thieno[3,2-d]pyrimidine by Method B 0.063 gm. (0.01 mol) of 100% nitric acid was added to a solution of 2.9 gm. (0.01 mol) of 2-(2'-furyl)-4-morpholino-thieno[3,2-d]pyrimidine in 30 ml. of acetic acid anhydride, whereby the nitrate of the starting compound crystallized out, which was collected by vacuum filtration, washed with acetic acid anhydride, and then introduced at room temperature into 30 ml. of concentrated sulfuric acid, while stirring. The mixture was allowed to stand at room temperature for five hours, was then poured over ice, and, while exteriorly cooling, concentrated ammonia was added to the aqueous mixture until its pH had adjusted to 6. A crystalline precipitate formed, which was collected by vacuum filtration and recrystallized once from dioxane and once from dimethylformamide. 1.05 gm. (32% of theory) of the compound of the formula

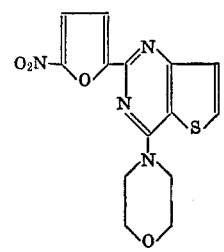

M.P. 218–219° C., were obtained.

Analysis.—$C_{14}H_{12}N_4O_4S$; mol. wt. 332.34. Calculated (percent): C, 50.60; H, 3.64; N, 16.87. Found (percent): C, 50.50; H, 3.59; N, 17.01.

EXAMPLE 76

Using a procedure analogous to that described in Example 75, 4-[(β-acetylamino-ethyl)-amino]-2-(5'-nitro-2'-furyl)-thieno[3,2-d]pyrimidine, M.P. 241–242° C. (recrystallized from methanol/dimethylformamide), was prepared from 4-[(β-acetylamino-ethyl)-amino]-2-(2'-furyl)-thieno[3,2-d]pyrimidine nitrate and concentrated sulfuric acid.

EXAMPLE 77

Using a procedure analogous to that described in Example 75, 4-acetylamino-2-(5'-nitro-2'-furyl)-thieno[3,2-d]pyrimidine, M.P. 259–260° C. (recrystallized from acetone), was prepared from 4-acetylamino-2-(2'-furyl)-thieno[3,2-d]pyrimidine nitrate and concentrated sulfuric acid.

EXAMPLE 78

4-[(β-amino-ethyl)-amino]-2-(5'-nitro-2'-furyl)-thieno[3,2-d]pyrimidine hydrochloride A mixture consisting of 7.0 gm. (0.02 mol) of 4-[(β-acetylamino-ethyl)-amino] - 2 - (5'-nitro-2'-furyl)-thieno[3,2-d]pyrimidine and 75 ml. of concentrated hydrochloric acid was heated for ten hours on a boiling water bath. Thereafter, the resulting clear solution was evaporated to dryness, and the residue was recrystallized from aqueous ethanol. 4.0 gm. (59% of theory) of the compound of the formula

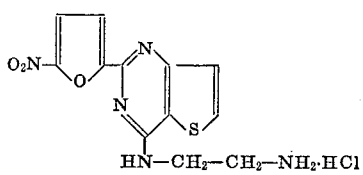

M.P. 292° C. (decomp.), were obtained.
Analysis.—$C_{12}H_{11}N_5O_3S \cdot HCl$; mol. wt. 341.79. Calculated (percent): C, 42.16; H, 3.54; N, 20.49; Cl, 10.38. Found (percent): C, 42.35; H, 3.64; N, 20.48; Cl, 10.32.

EXAMPLE 79

Using a procedure analogous to that described in Example 78, 4-[(γ-amino-n-propyl)-amino]-2-(5'-nitro-2'-furyl)-thieno[3,2-d]pyrimidine hydrochloride, M.P. >300° C. (recrystallized from ethanol), was prepared from 4-[(γ-acetylamino-n-propyl)-amino]-2-(5'-nitro-2'-furyl)-thieno[3,2-d]pyrimidine and concentrated hydrochloric acid.

EXAMPLE 80

Using a procedure analogous to that described in Example 78, 4-[(β-amino-ethyl)-amino]-6-methyl-2-(5'-nitro-2'-furyl)-thieno[3,2-d]pyrimidine hydrochloride, M.P. >300° C. (recrystallized from water), was prepared from 4 - [(β-acetylamino-ethyl)-amino] - 6-methyl-2-(5'-nitro-2'-furyl)-thieno[3,2-d]pyrimidine and concentrated hydrochloric acid.

EXAMPLE 81

Using a procedure analogous to that described in Example 78, 4-[(β-hydroxy-ethyl)-amino]-2-(5'-nitro-2'-furyl)-thieno[3,2-d]pyrimidine hydrochloride, M.P. 174–175° C. (recrystallized from ethanol), was prepared from 4 - [(β-acetoxy-ethyl)-amino]-2-(5'-nitro-2'-furyl)-thieno[3,2-d]pyrimidine, M.P. 195–197° C. (from methyl ethyl ketone), and concentrated hydrochloric acid.

EXAMPLE 82

4-(chloroacetyl-amino)-2-(5'-nitro-2'-furyl)-thieno[3,2-d]pyrimidine

A suspension of 4.0 gm. (0.015 mol) of 4-amino-2-(5'-nitro-2'-furyl)-thieno[3,2-d]pyrimidine in 40 ml. of chloroacetyl chloride was refluxed for six hours; no dissolution took place. The reaction mixture was cooled, the insoluble matter was collected by vacuum filtration, and the filter cake was thoroughly washed first with chloroform and then with water, dried and recrystallized from methyl ethyl ketone. 2.5 gm. (49% of theory) of the compound of the formula

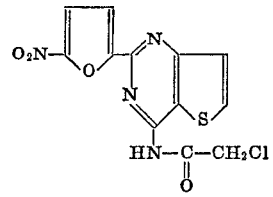

M.P. 206–209° C. (decomp.), were obtained.
Analysis.—$C_{12}H_7ClN_4O_4S$; mol. wt. 338.74. Calculated (percent): C, 42.55; H, 2.09; N, 16.54. Found (percent): C, 42.70; H, 2.15; N, 16.45.

EXAMPLE 83

Using a procedure analogous to that described in Example 82, 4 - (acetyl-amino)-2-(5'-nitro-2'-furyl)-thieno[3,2-d]pyrimidine, M.P. 259–260° C. (recrystallized from acetone), was prepared from 4-amino-2-(5'-nitro-2'-furyl)-thieno[3,2-d]pyrimidine and acetyl chloride.

EXAMPLE 84

Using a procedure analogous to that described in Example 82, 4 - (dichloroacetyl - amino) - 2 - (5'-nitro-2'-furyl)-thieno[3,2-d]pyrimidine, M.P. 241–242° C. (decomp.; recrystallized from ethanol/dimethylsulfoxide), was prepared from 4-amino-2-(5'-nitro-2'-furyl)-thieno[3,2-d]pyrimidine and dichloroacetyl chloride.

EXAMPLE 85

Using a procedure analogous to that described in Example 82, 4 - (propionyl-amino)-2-(5'-nitro-2'-furyl)-thieno[3,2-d]pyrimidine, M.P. 217–219° C. (recrystallized from ethanol), was prepared from 4-amino-2-(5'-nitro-2'-furyl)-thieno[3,2-d]pyrimidine and propionyl chloride.

EXAMPLE 86

4-morpholino-2-(5'-nitro-2'-furyl)-thieno[3,2-d]pyrimidine by Method C 1.05 gm. (0.015 mol) of sodium nitrite were added in small portions to a solution of 1.8 gm. (0.005 mol) of 2 - (5' - bromo - 2' - furyl)-4-morpholino-thieno[3,2-d]pyrimidine in 25 ml. of glacial acetic acid, and the reaction mixture was then refluxed for one hour. Thereafter, the resulting clear solution was poured into water, the precipitate formed thereby was collected by vacuum filtration, and the filter cake was washed with water, dried and recrystallized from dimethylformamide. 1.25 gm. (75% of theory) of the same compound as that obtained in Example 75, M.P. 218–219° C., were recovered.

EXAMPLE 87

Using a procedure analogous to that described in Example 86, 4-methylamino-2-(5'-nitro-2'-furyl)-thieno[3,2-d]pyrimidine, M.P. 263–264° C. (recrystallized from ethanol/dimethylformamide), was prepared from 4-methylamino - 2 - (5'-bromo - 2' - furyl)-thieno[3,2-d]pyrimidine and sodium nitrite.

EXAMPLE 88

Using a procedure analogous to that described in Example 86, 4 - [(β-methoxy-ethyl)-amino]-2-(5'-nitro-2' - furyl) - thieno[3,2-d]pyrimidine, M.P. 151–152° C. (recrystallized from methanol), was prepared from 4-[(β-methoxy-ethyl) - amino] - 2 - (5'-bromo-2'-furyl)-thieno[3,2-d]pyrimidine and sodium nitrite.

EXAMPLE 89

Using a procedure analogous to that described in Example 86, 4 - [(β-hydroxy-n-propyl)-amino]-2-(5'-nitro-2' - furyl) - thieno[3,2-d]pyrimidine, M.P. 192–193° C.

(recrystallized from ethanol), was prepared from 4-[(β-hydroxy - n - propyl) - amino]-2-(5'-bromo-2'-furyl)-thieno[3,2-d]pyrimidine and sodium nitrite.

EXAMPLE 90

Using a procedure analogous to that described in Example 86, 4 - [(β-hydroxy-ethyl)-amino]-2-(5'-nitro-2'-furyl) - thieno[3,2-d]pyrimidine, M.P. 174–175° C. (recrystallized from ethanol), was prepared from 4-[(β-hydroxy-ethyl) - amino] - 2 - (5' - bromo-2'-furyl)-thieno-[3,2-d]pyrimidine and sodium nitrite.

EXAMPLE 91

Using a procedure analogous to that described in Example 86, 4 - [(β,γ - dihydroxy-n-propyl)-amino]-2-(5'-nitro - 2' - furyl) - thieno[3,2-d]pyrimidine, M.P. 179–180° C. (recrystallized from methanol), was prepared from 4 - [(β,γ - dihydroxy - n - propyl) - amino]-2-(5'-bromo - 2' - furyl) - thieno[3,2-d]pyrimidine and sodium nitrite.

EXAMPLE 92

Using a procedure analogous to that described in Example 86, 4 - amino - 2 - (5' - nitro - 2' - furyl)-thieno-[3,2-d]pyrimidine, M.P. >300° C. (recrystallized from dimethylformamide), was prepared from 4-amino-2-(5'-bromo - 2' - furyl)-thieno[3,2-d]pyrimidine and sodium nitrite.

EXAMPLE 93

4-(β-methoxyethyl-amino)-6-methyl-2-(5'-nitro-2'-furyl)-thieno[3,2-d]pyrimidine by Method B 0.063 gm. (0.01 mol) of 100% nitric acid was added to a solution of 2.9 gm. (0.01 mol) of 2-furyl-4-(β-methoxyethyl-amino) - 6 - methyl - thieno[3,2-d]pyrimidine in 30 ml. of acetic acid anhydride. The crystalline nitrate formed thereby was collected by vacuum filtration, washed with acetic acid anhydride and then stirred at room temperature into 30 ml. of concentrated sulfuric acid. The mixture was stirred for five hours at 25° C., then poured over ice and, while cooling the aqueous mixture, concentrated ammonia was added thereto until it had a pH of 6. A crystalline precipitate was formed, which was collected by vacuum filtration and recrystallized from a mixture of dimethylformamide and methylene chloride, yielding 0.8 gm. (25% of theory) of the compound of the formula

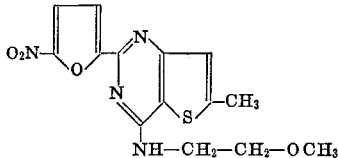

having a melting point of 174–175° C.

*Analysis.*—$C_{14}H_{14}N_4O_4S$; mol. wt. 334.36. Calculated (percent): C, 50.28; H, 4.22; N, 16.76. Found (percent): C, 50.36; H, 4.27; N, 16.70.

EXAMPLE 94

4-amino-2-(5'-nitro-2'-furyl)-thieno[3,2-d] pyrimidine by Method A

A solution of 0.5 gm. (0.03 mol) of ammonia in 10 ml. of ethanol was added dropwise over a period of an hour to a suspension of 2.8 gm. (0.01 mol) of 4-chloro-2-(5'-nitro - 2' - furyl) - thieno[3,2-d]pyrimidine at 60° C., and the resulting reaction mixture was allowed to stand for one hour more at 60° C. Thereafter, the reaction mixture was cooled and then poured into 50 ml. of methylene chloride. The precipitate formed thereby was collected by vacuum filtration, thoroughly washed with water, dried and recrystallized from dimethylformamide, yielding 2.0 gm. (76% of theory) of 4-amino-2-(5'-nitro-2'-furyl)-thieno[3,2-d]pyrimidine, M.P. >300° C.

*Analysis.*—$C_{10}H_6N_4O_3S$; mol. wt. 262.26. Calculated (percent): C, 45.81; H, 2.31; N, 21.37. Found (percent): C, 45.70; H, 2.38; N, 21.25.

EXAMPLE 95

2-(5'-nitro-2'-furyl)-4-thiomorpholino-thieno[3,2-d] pyrimidine by Method B 0.63 gm. (0.01 mol) of 100% nitric acid were added to a solution of 3.0 gm. (0.01 mol) of 2-(2'-furyl)-4-thiomorpholino-thieno[3,2-d]pyrimidine (prepared from 4-chloro-2-(2'-furyl)-thieno[3,2-d]pyrimidine and thiomorpholine) in 30 ml. of acetic acid anhydride. The nitrate formed thereby was collected by vacuum filtration, washed with acetic acid anhydride and then introduced into 30 ml. of concentrated sulfuric acid at room temperature, while stirring. The mixture was then stirred at room temperature for five hours, thereafter poured over ice and, while cooling the aqueous mixture, concentrated ammonia was added thereto until it had a pH of 6. The crystalline precipitate formed thereby was collected by vacuum filtration and recrystallized from ethyl acetate, yielding 0.9 gm. (26% of theory) of 2-(5'-nitro-2'-furyl)-4-thiomorpholino-thieno[3,2-d]pyrimidine, M.P. 205–207° C.

*Analysis.*—$C_{14}H_{12}N_4O_3S_2$; mol. wt. 348.41. Calculated (percent): C, 48.26; H, 3.48; N, 16.08. Found (percent): C, 48.14; H, 3.49; N, 16.15.

EXAMPLE 96

Using a procedure analogous to that described in Example 95, 4-acetamino-2-(5'-nitro-2'-furyl)-thieno[3,2-d] pyrimidine, M.P. 259–260° C. (recrystallized from acetone), was prepared from 4-acetamino-2-(2'-furyl)-thieno[3,2-d]pyrimidine nitrate and concentrated sulfuric acid.

EXAMPLE 97

4-(morpholino-2-(5'-nitro-2'-furyl)-thiono[3,2-d] pyrimidine by Method D 3.3 gm. (0.01 mol) of 2-(5'-carboxyl-2'-furyl)-4-morpholino-thieno[3,2-d]pyrimidine were dissolved in 15 ml. of concentrated sulfuric acid, and, while vigorously stirring the resulting solution, a solution of 0.85 gm. (0.01 mol) of sodium nitrate in 15 ml. of sulfuric acid, cooled to 0° C., was added thereto. The reaction mixture was allowed to stand at 20° C. for two hours, was then poured over ice, and the aqueous mixture was neutralized with solid sodium bicarbonate and extracted four times with chloroform. The chloroform extracts were combined, washed with water, dried over sodium sulfate, the chloroform was distilled off in vacuo, and the residue was recrystallized from dimethylformamide, yielding 0.9 gm. (27% theory) of 4-morpholino - 2 - (5'-nitro-2'-furyl)-thieno [3,2-d]pyrimidine, M.P. 218–219° C.

*Analysis.*—$C_{14}H_{12}N_4O_4S$; mol. wt. 332.34. Calculated (percent): C, 50.60; H, 3.64; N, 16.87. Found (percent): C, 50.71; H, 3.69; N, 16.74.

EXAMPLE 98

Using a procedure analogous to that described in Example 97, 4-methylamino-2-(5'-nitro-2'-furyl)-thieno[3,2-d] pyrimidine, M.P. 263–264° C. (recrystallized from ethanol/dimethylformamide), was prepared from 2-(5'-carboxy-2'-furyl)-4-methylamino - thieno[3,2-d]pyrimidine, sodium nitrate and sulfuric acid.

EXAMPLE 99

Using a procedure analogous to that described in Example 97, 4-(β-methoxyethyl-amino)-2-(5'-nitro-2'-furyl)-thieno[3,2-d]pyrimidine, M.P. 151–152° C. (recrystallized from methanol), was prepared from 2-(5'-carboxy-2'-furyl)-4-(β - methoxyethyl-amino)-thieno[3,2-d]pyrimidine, sodium nitrate and sulfuric acid.

EXAMPLE 100

Using a precedure analogous to that described in Example 97, 4-(β - hydroxy-n-propyl-amino)-2-(5'-nitro-2'-furyl)-thieno[3,2-d]pyrimidine, M.P. 192–193° C. (recrystallized from ethanol), was prepared from 2-(5'-carboxy - 2' - furyl) - 4 - (β-hydroxy-n-propyl-amino)-thieno [3,2-d]pyrimidine, sodium nitrate and sulfuric acid.

EXAMPLE 101

Using a procedure analogous to that described in Example 97, 4-(β-hydroxyethyl-amino)-2-(5'-nitro-2'-furyl)-thieno[3,2-d]pyrimidine, M.P. 174–175° C. (recrystallized from ethanol), was prepared from 2-(5'-carboxy-2'-furyl) - 4 - (β-hydroxyethyl-amino)-thieno[3,2-d]pyrimidine, sodium nitrate and sulfuric acid.

EXAMPLE 102

Using a procedure analogous to that described in Example 97, 4 - (β,γ-dihydroxy-n-propyl-amino)-2-(5'-nitro-furyl)-thieno[3,2-d]pyrimidine, M.P. 179–180° C. (recrystallized from methanol), was prepared from 2-(5'-carboxy - 2' - furyl)-4-(β,γ-dihydroxy-n-propyl-amino)-thieno[3,2-d]pyrimidine, sodium nitrate and sulfuric acid.

EXAMPLE 103

Using a procedure analogous to that described in Example 97, 4-amino-2-(5'-nitro-2'-furyl)-thieno[3,2-d]pyrimidine, M.P. >300° C. (recrystallized from dimethylformamide), was prepared from 2-(5'-carboxy-2'-furyl)-4-amino-thieno[3,2-d]pyrimidine, sodium nitrate and sulfuric acid.

The compounds according to the present invention, that is, those embraced by Formula I and their non-toxic, pharmacologically acceptable acid addition salts, have useful pharmacodynamic properties. More particularly, the compounds of the present invention exhibit bactericidal activities against gram-positive and gram-negative bacteria, as well as fungicidal and trichomonacidal activities, the latter against *Trichomonas vaginalis*, for example, in warm-blooded animals.

The anti-bacterial activity was determined by the agar-diffusion test and by the series-dilution test analogous to the method described by P. Klein in "Bakteriologische Grundlagen der Chemotherapeutischen Laboratoriumspraxis," Springer-Verlag, 1957, pages 53–76 and 87–109.

Thus, for example, the following compounds were found to exhibit especially effective anti-bacterial activities against *Staphylococcus aureus* SG 511 at concentrations of less than 3 γ/ml., against *Streptococcus aronson* at concentrations of less than 2 γ/ml., and against *Escherichia coli* at concentrations of less than 25 γ/ml.:

2-(5'-nitro-2'-furyl)-4-methylamino-thieno[3,2-d]pyrimidine;
2-(5'-nitro-2'-furyl)-4-[(β-hydroxy-ethyl)-amino]-thieno[3,2-d]pyrimidine;
2-(5'-nitro-2'-furyl)-4-[β,γ-dihydroxy-n-propyl)amino]-thieno[3,2-d]pyrimidine;
2-(5'-nitro-2'-furyl)-4-[(β-hydroxy-n-propyl)amino]-thieno[3,2-d]pyrimidine;
2-(5'-nitro-2'-furyl)-4-[bis-(β-hydroxy-ethyl)-amino]-thieno[3,2-d]pyrimidine;
2-(5'-nitro-2'-furyl)-4-[N-(β-hydroxy-ethyl)-methylamino]-thieno[3,2-d]pyrimidine;
2-(5'-nitro-2'-furyl)-4-[(β-methoxy-ethyl)-amino]-6-methyl-thieno[3,2-d]pyrimidine;
2-(5'-nitro-2'-furyl)-4-amino-thieno[3,2-d]pyrimidine;
2-(5'-nitro-2'-furyl)-4-acetylamino-thieno[3,2-d]pyrimidine; and
2-(5'-nitro-2'-furyl)-4-[(β,γ-dihydroxy-n-propyl)-amino]-6-methyl-thieno[3,2-d]pyrimidine.

Likewise, the following compounds were found to be especially effective trichomonacides against *Trichomonas vaginalis* at concentrations of less than 0.1 γ/ml.:

2-(5'-nitro-2'-furyl)-4-[(β-hydroxy-n-propyl)-amino]-thieno[3,2-d]pyrimidine;
2-(5'-nitro-2'-furyl)-4-(3"-hydroxy-piperidino)-thieno-[3,2-d]pyrimidine;
2-(5'-nitro-2'-furyl)-4-[N-(β-hydroxy-ethyl)-methylamino]-thieno[3,2-d]pyrimidine;
2-(5'-nitro-2'-furyl)-4-(4"-hydroxy-piperidino)-thieno-[3,2-d]pyrimidine;
2-(5'-nitro-2'-furyl)-4-[4"-hydroxy-n-butyl)-amino]-thieno[3,2-d]pyrimidine;
2-(5'-nitro-2'-furyl)-4-[(β-hydroxy-γ-diethylamino-n-propyl)-amino]-thieno[3,2-d]pyrimidine;
2-(5'-nitro-2'-furyl)-4-(dichloroacetyl-amino)-thieno-[3,2-d]pyrimidine; and
2-(5'-nitro-2'-furyl)-4-(thiomorpholino-1-oxide)-thieno[3,2-d]pyrimidine.

For pharmaceutical purposes the compounds according to the present invention are administered to warm-blooded animals perorally or topically as active ingredients in customary pharmaceutical compositions, that is, compositions consisting essentially of an inert pharmaceutical carrier and one effective amount of the active ingredients, such as tablets, coated pills, capsules, wafers, powders, solutions, suspensions, emulsions, syrups, tinctures, lotions, suppositories and the like. One effective oral dosage unit of the compounds according to the present invention is from 0.166 to 3.34 mgm./kg. body weight, preferably 0.83 to 1.67 mgm./kg. body weight. The effective concentration of the compounds in a composition for topical application is from 0.1 to 2.0% by weight, preferably 1% by weight, based on the total weight of the composition.

The following examples illustrate a few pharmaceutical compositions comprising a compound of the present invention as an active ingredient and represent the best modes contemplated of putting the invention into practical use. The parts are parts by weight unless otherwise specified.

EXAMPLE 104

Tablets

The tablet composition was compounded from the following ingredients:

| | Parts |
|---|---|
| 2-(5'-nitro - 2' - furyl) - 4 - [(β-hydroxy-ethyl)-amino]-thieno[3,2-d]pyrimidine | 100.0 |
| Lactose | 63.0 |
| Potato starch | 50.0 |
| Polyvinylpyrrolidone | 5.0 |
| Magnesium stearate | 2.0 |
| Total | 220.0 |

Preparation

The thienopyrimidine compound was intimately admixed with the lactose and the potato starch, the mixture was moistened with an aqueous 10% solution of the polyvinylpyrrolidone, the moist mass was forced through a 1.5 mm.-mesh screen, the resulting granulate was dried at 45° C. and again passed through the said screen, the dry granulate was admixed with the magnesium stearate, and the composition was compressed into 220 mgm.-tablets in a conventional tablet-making machine. Each tablet contained 100 mgm. of the thienopyrimidine compound and, when perorally administered to a warm-blooded animal of about 60 kg. body weight in need of such treatment, produced very good bactericidal effects against grampositive and gramnegative bacteria.

EXAMPLE 105

Coated pills

The pill core composition was compounded from the following ingredients:

| | Parts |
|---|---|
| 2-(5'-nitro - 2' - furyl) - 4 - [(β-hydroxy-ethyl)-amino]-thieno[3,2-d]pyrimidine | 50.0 |
| Lactose | 30.0 |
| Corn starch | 30.0 |

| | Parts |
|---|---|
| Gelatin | 3.0 |
| Cellulose, microcrystalline | 6.0 |
| Magnesium stearate | 1.0 |
| Total | 120.0 |

Preparation

The thienopyrimidine compound, the lactose and the corn starch were intimately admixed with each other, the mixture was moistened with an aqueous 12% solution of the gelatin, the moist mass was forced through a 1.5 mm.-mesh screen, the resulting granulate was dried at 45° C. and again passed through a 1.0 mm.-mesh screen, the dry granulate was admixed with the magnesium stearate, and the resulting composition was compressed into 120 mgm.-pill cores in a conventional pill-making machine. The pill cores were then coated with a thin shell consisting essentially of a mixture of talcum and sugar, and finally polished with beeswax. Each coated pill contained 50 mgm. of the thienopyrimidine compound and, when administered perorally to a warm-blooded animal of about 60 kg. body weight in need of such treatment, produced a very effective bactericidal action against grampositive and gramnegative bacteria.

EXAMPLE 106

Vaginal tablets

The tablet composition was compounded from the following ingredients:

| | Parts |
|---|---|
| 2-(5' - nitro-2'-furyl)-4-[($\beta$-hydroxyethyl)-amino]thieno[3,2-d]pyrimidine | 100.0 |
| Sorbitol | 885.0 |
| Carboxymethyl cellulose, high viscosity | 10.0 |
| Magnesium stearate | 5.0 |
| Total | 1000.0 |

Preparation

The thienopyrimidine compound was intimately admixed with the sorbitol and the carboxymethyl cellulose, the mixture was moistened with 150 parts of aqueous 50% ethanol, the moist mass was forced through a 2 mm.-mesh screen, the resulting granulate was dried at 45° C. and again passed through the said screen, the dry granulate was admixed with the magnesium stearate, and the composition was compressed into 1000 mgm.-tablets in a conventional tablet-making machine. Each tablet contained 100 mgm. of the thienopyrimidine compound and, when administered by the vaginal route to a female warm-blooded animal in need of such treatment, produced very effective trichomonacidal effects against *Trichomonas vaginalis*.

EXAMPLE 107

Tincture

The tincture was compounded from the following ingredients:

| | Parts |
|---|---|
| 2-(5' - nitro-2'-furyl)-4-[($\beta$-hydroxy-ethyl)-amino]thieno[3,2-d]pyrimidine | 1.0 |
| Polyethyleneglycol 400 | 99.0 |
| Total | 100.0 |

Preparation

The polyethyleneglycol was warmed, the thienopyrimidine compound was dissolved therein, and the solution was cooled to room temperature and filtered. The resulting tincture contained 1% by weight of the thienopyrimidine compound and, when topically applied to a skin area of a warm-blooded animal infested with grampositive and/or gramnegative bacteria, produced a very effective bactericidal action.

EXAMPLE 108

The lotion was compounded from the following ingredients:

Lotion

| | Parts |
|---|---|
| 2-(5' - nitro-2'-furyl)-4-[($\beta$-hydroxy-ethyl)-amino]thieno[3,2-d]pyrimidine | 1.0 |
| Sorbitan monopalmitate (Span 40) | 1.0 |
| Water-soluble polyglycol ether (Cremophor O) | 2.0 |
| Cetyl stearyl alcohol (Lanette O) | 2.0 |
| Cetaceum | 1.0 |
| Decyl oleate | 5.0 |
| Paraffin oil | 1.0 |
| Distilled water | 87.0 |
| Total | 100.0 |

Preparation

The inert ingredients were admixed, the mixture was melted and heated to 70° C., and the molten mass was emulsified in the distilled water at the same temperature, the emulsion was cooled to 40° C., and the finely milled thienopyrimidine compound was uniformly distributed therein with the aid of an immersion homogenizer. The resulting lotion contained 1% by weight of the thienopyrimidine compound and, when topically applied to a skin area of a warm-blooded animal infested with grampositive and/or gramnegative bacteria, produced a very effective bactericidal action.

EXAMPLE 109

Coated pills with combination of active ingredients

The pill core composition was compounded from the following ingredients:

| | Parts |
|---|---|
| 2-(5' - nitro-2'-furyl)-4-[($\beta$-hydroxy-ethyl)-amino]thieno[3,2-d]pyrimidine | 50.0 |
| Papaverine | 25.0 |
| Corn starch | 32.0 |
| Gelatin | 3.0 |
| Cellulose, microcrystalline | 9.0 |
| Magnesium stearate | 1.0 |
| Total | 120.0 |

Preparation

The thienopyrimidine compound and the papaverine were intimately admixed with the corn starch, the mixture was moistened with an aqueous 10% solution of the gelatin, the moist mass was forced through a 1.5 mm.-mesh screen, the resulting granulate was dried at 45° C. and again passed through a 1.0 mm.-mesh screen, the dry granulate was admixed with the cellulose and the magnesium stearate, and the composition was compressed into 120 mgm.-pill cores in a conventional pill-making machine. The pill cores were then coated with a thin shell consisting essentially of a mixture of talcum and sugar, and finally polished with beeswax. Each coated pill contained 50 mgm. of the thienopyrimidine compound and 25 mgm. of papaverine and, when perorally administered to a warm-blooded animal of about 60 kg. body weight in need of such treatment, produced very effective smooth muscle relaxing and bactericidal actions.

EXAMPLE 110

Gelatin capsules

The capsule filler composition was compounded from the following ingredients:

| | Parts |
|---|---|
| 2-(5' - nitro-2'-furyl)-4-methylamino-thieno[3,2-d]pyrimidine | 150.0 |
| Lactose | 100.0 |
| Talcum | 50.0 |
| Total | 300.0 |

Preparation

The ingredients were intimately admixed with each other, the mixture was passed through a 1.0 mm.-mesh screen, and 300 mgm.-portions thereof were filled into gelatin capsules of suitable size. Each capsule contained 150 mgm. of the thienopyrimidine compound and, when perorally administered to a warm-blooded animal of about 60 kg. body weight in need of such treatment, produced a very effective bactericidal action against gram-negative and grampositive bacteria.

Analogous results were obtained when any one of the other thienopyrimidines embraced by Formula I or a non-toxic acid addition salt thereof was substituted for the particular thienopyrimidine in Examples 104 through 110. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

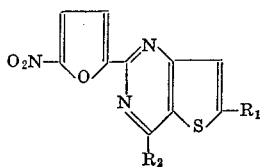

wherein $R_1$ is hydrogen or methyl, and
$R_2$ is amino, (alkyl of 1 to 5 carbon atoms)-amino, di-(alkyl of 1 to 4 carbon atoms)-amino, (monohydroxy-alkyl of 2 to 5 carbon atoms)-amino, (2,3-dihydroxy-n-propyl)-amino, (alkoxy of 1 to 2 carbon atoms-alkyl of 1 to 3 carbon atoms)-amino, N-(hydroxy-alkyl of 2 to 3 carbon atoms)-N-alkyl of 1 to 4 carbon atoms)-amino, N-methyl-D-glucamino, di-(hydroxy-alkyl of 1 to 5 carbon atoms)-amino, [(di-alkyl of 1 to 2 carbon atoms)-amino-alkyl of 2 to 3 carbon atoms]-amino, (1-methyl-2-hydroxyethyl)-amino, (2-phenyl-2-hydroxy-ethyl) amino, (2-hydroxy-3-diethylamino-n-propyl)-amino, (alkanoyl of 1 to 2 carbon atoms)-amino, chloroacetyl-amino, dichloroacetyl-amino, (amino-alkyl of 2 to 3 carbon atoms)-amino, (acetyl-amino-alkyl of 2 to 3 carbon atoms)-amino, allylamino, anilino, chloroanilino, methylanilino, hydroxyanilino, methoxyanilino, N-methyl-anilino, benzylamino, phenethyl-amino, cyclohexyl-amino, (hydroxy - cyclohexyl)-amino, pyrrolidino, piperidino, hydroxy-piperidino, morpholino, thiomorpholino, thiomorpholino-1-oxide, piperazino, N-methyl-piperazino, N-hydroxyethylpiperazino, N-formyl-piperazino or N-carbethoxy-piperazino, or a non-toxic, pharmacologically acceptable acid addition salt thereof.

2. A compound according to claim 1, which is 2-(5'-nitro-2'-furyl)-4-methylamino-thieno[3,2-d]pyrimidine or a non-toxic, pharmacologically acceptable acid addition salt thereof.

3. A compound according to claim 1, which is 2-(5'-nitro-2'-furyl)-4-[β,γ-dihydroxy-n-propyl)-amino]thieno-[3,2-d]pyrimidine or a non-toxic, pharmacologically acceptable acid addition salt thereof.

4. A compound according to claim 1, which is 2-(5'-nitro-2'-furyl)-4-[(β-hydroxy-ethyl)-amino]thieno[3,2-d]pyrimidine or a non-toxic, pharmacologically acceptable acid addition salt thereof.

5. A compound according to claim 1, which is 2-(5'-nitro-2'-furyl)-4-[(β-hydroxy - n - propyl)-amino]-thieno-[3,2-d]pyrimidine or a non-toxic, pharmacologically acceptable acid addition salt thereof.

6. A compound according to claim 1, which is 2-(5'-nitro - 2' - furyl)-4-[bis-(β-hydroxy-ethyl)-amino]-thieno-[3,2-d]pyrimidine or a non-toxic, pharmacologically acceptable acid addition salt thereof.

7. A compound according to claim 1, which is 2-(5'-nitro-2'-furyl) - 4 - [N-(β-hydroxy-ethyl)methylamino]-thieno[3,2-d]pyrimidine or a non-toxic, pharmacologically acceptable acid addition salt thereof.

8. A compound according to claim 1, which is 2-(5'-nitro-2'-furyl) - 4 - (β-methoxyethyl - amino)-6-methyl-thieno[3,2-d]pyrimidine or a non-toxic, pharmacologically acceptable acid addition salt thereof.

9. A compound according to claim 1, which is 2-(5'-nitro-2'-furyl)-4-amino-thieno[3,2-d]pyrimidine or a non-toxic, pharmacologically acceptable acid addition salt thereof.

10. A compound according to claim 1, which is 4-acetylamino-2-(5'-nitro-2'-furyl)-thieno[3,2-d]pyrimidine or a non-toxic, pharmacologically acceptable acid addition salt thereof.

11. A compound according to claim 1, which is 4-(β,γ-dihydroxy - n - propyl-amino)-6-methyl-2-(5'-nitro-2'-furyl)-thieno[3,2-d]pyrimidine or a non-toxic, pharmacologically acceptable acid addition salt thereof.

References Cited
UNITED STATES PATENTS

| | | | |
|---|---|---|---|
| 3,272,811 | 9/1966 | Ohnacker et al. | 260—256.5 R |
| 3,318,881 | 5/1967 | Ohnacker et al. | 260—256.6 R |

ALEX MAZEL, Primary Examiner

R. J. GALLAGHER, Assistant Examiner

U.S. Cl. X.R.

260—243 B, 247.1, 251 A, 253; 424—246, 248, 251, 253

PO-1050
(5/69)

UNITED STATES PATENT OFFICE
CERTIFICATE OF CORRECTION

Patent No. 3,661,908　　　Dated　May 9, 1972

Inventor(s) EBERHARD WOITUN and WOLFGANG REUTER

It is certified that error appears in the above-identified patent and that said Letters Patent are hereby corrected as shown below:

Col. 5, line 42 - correct "12.50" to read --12.59--.

Col. 6, line 24 - correct "12.85" to read --12.84--.

Col. 8, lines 3,4,5 - delete ", M.P. 148-150°C. from 2-(2'-furl)-4-[β,γ-dihydroxy-n-propyl)-amino]-thieno[3,2-d]pyridine" ;
　　　line 10 - insert heading --2-(2'-Furyl)-4-acetylamino-thieno[3,2-d]pyrimidine--.

Col.10, line 26 - correct the spelling of "thieno".

Col. 11, line 60 - correct the formula to read:

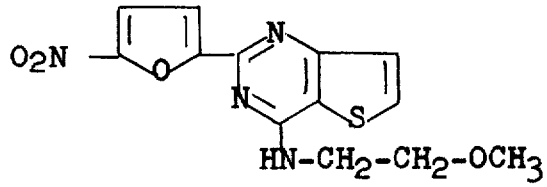

Col. 12, line 20 - correct "3,3-d" to read --3,2-d--;
　　　line 33 - correct "16" to read --166--.

Col. 22, line 19 - correct "HN-CH$_2$-CH$_2$-H-C-CH$_2$N
　　　to read:
　　　　　　　--HN-CH$_2$-CH$_2$-NH-C-CH$_3$  --.

Col. 26,
　　　line 35 - correct "thiono" to read --thieno--.

Signed and sealed this 27th day of March 1973.

(SEAL)
Attest:

EDWARD M. FLETCHER, JR.　　　　　ROBERT GOTTSCHALK
Attesting Officer　　　　　　　　Commissioner of Patents